(12) United States Patent
Samuelsson-Allendes et al.

(10) Patent No.: US 12,519,936 B2
(45) Date of Patent: Jan. 6, 2026

(54) SYSTEMS AND METHODS FOR PERFORMING MOTION COMPENSATION FOR BI-PREDICTION BASED ON SUBBLOCK DIMENSIONS IN VIDEO CODING

(71) Applicant: SHARP KABUSHIKI KAISHA, Sakai (JP)

(72) Inventors: Jonatan Alfred Samuelsson-Allendes, Stochholm (SE); Sachin G. Deshpande, Vancouver, WA (US)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 18/748,764

(22) Filed: Jun. 20, 2024

(65) Prior Publication Data

US 2025/0392708 A1    Dec. 25, 2025

(51) Int. Cl.
*H04N 19/117* (2014.01)
*H04N 19/51* (2014.01)
*H04N 19/80* (2014.01)

(52) U.S. Cl.
CPC .......... *H04N 19/117* (2014.11); *H04N 19/51* (2014.11); *H04N 19/80* (2014.11)

(58) Field of Classification Search
CPC ...... H04N 19/117; H04N 19/70; H04N 19/80; H04N 19/176; H04N 19/82; H04N 19/105; H04N 19/593; H04N 19/11; H04N 19/159; H04N 19/132; H04N 19/186; H04N 19/85; H04N 19/167; H04N 19/172; H04N 19/51; H04N 19/59; H04N 19/635; H04N 19/107; H04N 19/119; H04N 19/137; H04N 19/139; H04N 19/42; H04N 19/44; H04N 19/463; H04N 19/52; H04N 19/587; H04N 19/86; H04N 19/503; H04N 19/507; H04N 19/50
USPC ............................................ 375/240–240.29
See application file for complete search history.

(56) References Cited

U.S. PATENT DOCUMENTS

| | | | |
|---|---|---|---|
| 2021/0092457 A1* | 3/2021 | Luo ........................ | H04N 19/80 |
| 2022/0272388 A1* | 8/2022 | Jang ........................ | H04N 19/70 |
| 2023/0131812 A1* | 4/2023 | Zhang .................... | H04N 19/593 |
| | | | 375/240.12 |
| 2023/0283769 A1* | 9/2023 | Seregin ................... | H04N 19/61 |
| | | | 375/240.12 |
| 2023/0328257 A1* | 10/2023 | Zhang ..................... | H04N 19/182 |

OTHER PUBLICATIONS

Segall et al. "Spatial Scalability Within the H.264/AVC Scalable Video Coding Extension" IEEE Transactions on Circuits and Systems for Video Technology • Oct. 2007, 16 Pages.*

(Continued)

*Primary Examiner* — Nathnael Aynalem
(74) *Attorney, Agent, or Firm* — J. Fish Law, PLLC

(57) ABSTRACT

A device may be configured to determine motion compensation interpolation filter. The device may be configured to select a motion compensation interpolation filter based on whether a block is predicted using uni-prediction or bi-prediction and whether a condition based on a subblock width and a subblock height is satisfied. The motion compensation interpolation filter may be defined according to cos-windowed sinc function.

6 Claims, 9 Drawing Sheets

(56) References Cited

OTHER PUBLICATIONS

Coban et al. "Algorithm description of Enhanced Compression Model 13 (ECM 13)" Joint Video Experts Team (JVET) of ITU-T SG 16 WP 3 and ISO/IEC JTC 1/SC 29 34th Meeting: Rennes, FR, Apr. 17-24, 2024, Document: JVET-AH2025, 98 Pages.*
ITU-T H.264 "Advanced video coding for generic audiovisual services" (Oct. 2016).
ITU-T H.265 "High Efficiency video coding" (Nov. 2019).
ITU-T H.266 "Versatile Video Coding" (Apr. 2022).
Algorithm Description of Enhanced Compression Model 12 (ECM 12), ISO/IEC JTC1/SC29, Document: JVET-AG2025, Jan. 17-26, 2024, Teleconference.

* cited by examiner

SYSTEMS AND METHODS FOR PERFORMING MOTION COMPENSATION FOR BI-PREDICTION BASED ON SUBBLOCK DIMENSIONS IN VIDEO CODING

TECHNICAL FIELD

This disclosure relates to video coding and more particularly to techniques for performing motion compensation in video coding.

BACKGROUND

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards also define the decoding process and decoders that follow the decoding process can be said to be conforming decoders. Video coding standards may incorporate video compression techniques. Examples of video coding standards include ISO/IEC MPEG-4 Visual and ITU-T H.264 (also known as ISO/IEC MPEG-4 AVC). High-Efficiency Video Coding (HEVC), and Versatile video coding (VVC). HEVC is described in High Efficiency Video Coding. Rec. ITU-T H.265. November 2019, which is referred to herein as ITU-T H.265. VVC is described in Versatile Video Coding, Rec. ITU-T H.266, April 2022, which is incorporated by reference, and referred to herein as ITU-T H.266. Extensions and improvements for ITU-T H.266 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized enhanced video coding technology beyond the capabilities of the VVC standard. The Enhanced Compression Model 12 (ECM 12). Algorithm Description of Enhanced Compression Model 12 (ECM 12), ISO/IEC JTC1/SC29 Document: JVET-AG2025, 17-26 Jan. 2024. Teleconference, which is incorporated by reference herein, describes the coding features that were under coordinated test model study by as potentially enhancing video coding technology beyond the capabilities of ITU-T H.266. It should be noted that the coding features of ECM 12 are implemented in ECM reference software. As used herein, the term ECM may collectively refer to algorithms included in ECM 12 and implementations of ECM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY

In general, this disclosure describes various techniques for coding video data. In particular, this disclosure describes techniques for performing motion compensation in video coding. It should be noted that although techniques of this disclosure are described with respect to ITU-T H.264, ITU-T H.265, ITU-T H.266, and ECM, the techniques of this disclosure are generally applicable to video coding. For example, the coding techniques described herein may be incorporated into video coding systems. (including video coding systems based on future video coding standards) including video block structures, intra prediction techniques, inter prediction techniques, transform techniques, filtering techniques, and/or entropy coding techniques other than those included in ITU-T H.264, ITU-T H.265, ITU-T H.266, and ECM. Thus, reference to ITU-T H.264, ITU-T H.265, ITU-T H.266, and/or ECM is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of encoding video data comprises determining whether a subblock is predicted using uni-prediction or bi-prediction, selecting a first motion compensation interpolation filter based on the subblock being predicted using uni-prediction, and selecting a second motion compensation interpolation filter based on the subblock being predicted using bi-prediction and whether a condition based on a subblock width and a subblock height is satisfied, wherein the first and second motion compensation interpolation filter are defined according to cos-windowed sinc function and the first and second motion compensation interpolation filter have a distinct window and scale for the cos-windowed sinc function.

In one example, a method of decoding video data comprises determining whether a subblock is predicted using uni-prediction or bi-prediction, selecting a first motion compensation interpolation filter based on the subblock being predicted using uni-prediction, and selecting a second motion compensation interpolation filter based on the subblock being predicted using bi-prediction and whether a condition based on a subblock width and a subblock height is satisfied, wherein the first and second motion compensation interpolation filter are defined according to cos-windowed sinc function and the first and second motion compensation interpolation filter have a distinct window and scale for the cos-windowed sinc function.

In one example, a device comprises one or more processors configured to determine whether a subblock is predicted using uni-prediction or bi-prediction, select a first motion compensation interpolation filter based on the subblock being predicted using uni-prediction, and select a second motion compensation interpolation filter based on the subblock being predicted using bi-prediction and whether a condition based on a subblock width and a subblock height is satisfied, wherein the first and second motion compensation interpolation filters are defined according to cos-windowed sinc function and the first and second motion compensation interpolation filters have a distinct window and scale for the cos-windowed sinc function.

In one example, a non-transitory computer-readable storage medium comprises instructions stored thereon that, when executed, cause one or more processors of a device to determine whether a subblock is predicted using uni-prediction or bi-prediction, select a first motion compensation interpolation filter based on the subblock being predicted using uni-prediction, and select a second motion compensation interpolation filter based on the subblock being predicted using bi-prediction and whether a condition based on a subblock width and a subblock height is satisfied, wherein the first and second motion compensation interpolation filters are defined according to cos-windowed sinc function and the first and second motion compensation interpolation filters have a distinct window and scale for the cos-windowed sinc function.

In one example, an apparatus comprises means for determining whether a subblock is predicted using uni-prediction or bi-prediction, means for selecting a first motion compensation interpolation filter based on the subblock being predicted using uni-prediction, and means for selecting a second motion compensation interpolation filter based on the subblock being predicted using bi-prediction and whether a condition based on a subblock width and a subblock height is satisfied, wherein the first and second motion compensation interpolation filter are defined according to cos-windowed sinc function and the first and second motion compensation interpolation filter have a distinct window and scale for the cos-windowed sinc function.

The details of one or more examples are set forth in the accompanying drawings and the description below. Other features, objects, and advantages will be apparent from the description and drawings, and from the claims.

DETAILED DESCRIPTION

Figure 1:
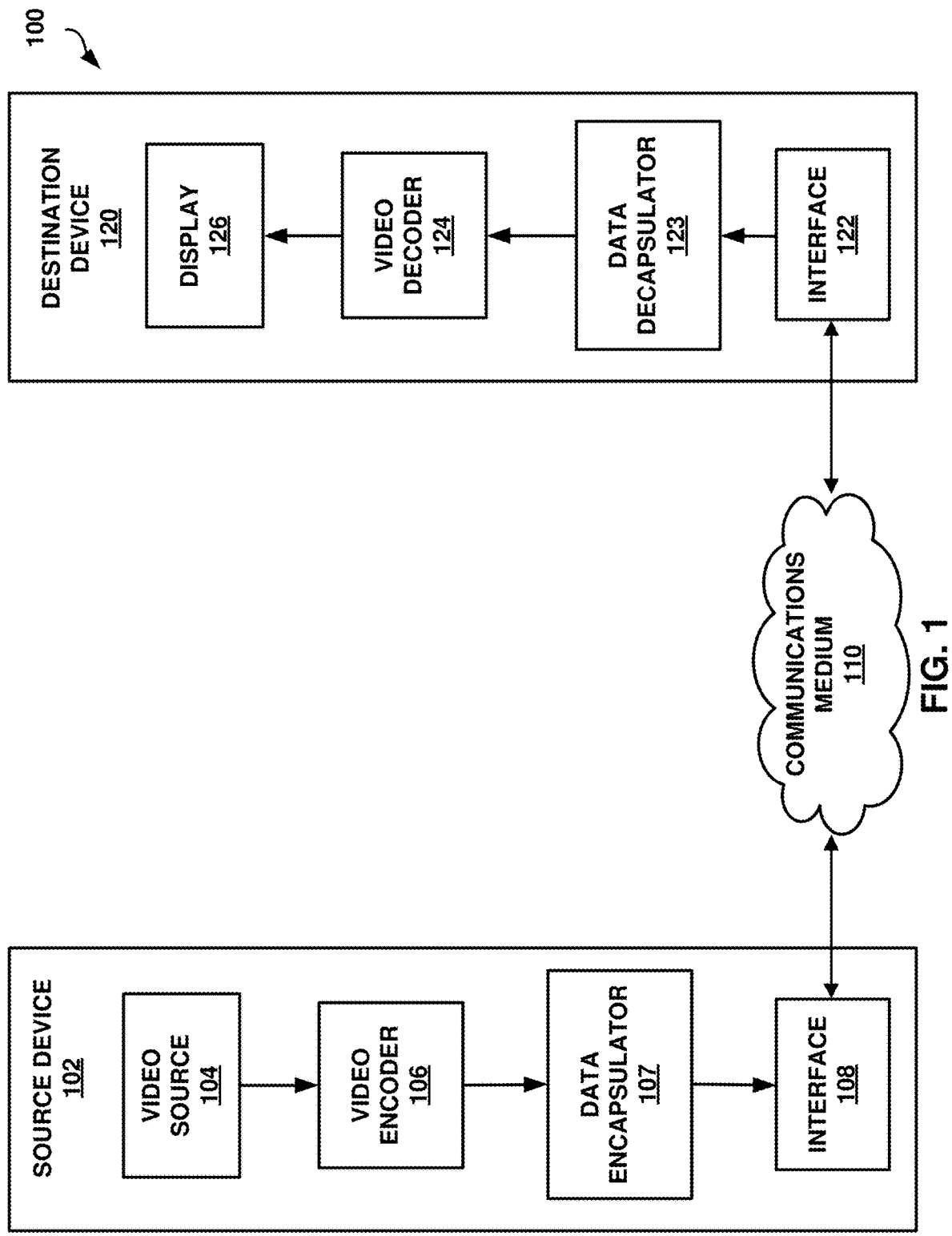
FIG. 1 is a block diagram illustrating an example of a system that may be configured to encode and decode video data according to one or more techniques of this disclosure.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components. (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. It should be noted that in some cases, the terms luma and luminance are used interchangeably.

A video encoder may perform predictive encoding on video blocks and sub-divisions thereof. Video blocks and sub-divisions thereof may be referred to as nodes. A subdivision of a block may be referred to as a subblock. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels. i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit structure having its root at the CU. In ITU-T H.265, prediction unit structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, intra prediction data (e.g., intra prediction mode syntax elements) or inter prediction data (e.g., motion data syntax elements) corresponding to a PB is used to produce reference and/or predicted sample values for the PB. ITU-T H.266 specifies a CTU having a maximum size of 128×128 luma samples. In ITU-T H.266, CTUs are partitioned according a quadtree plus multi-type tree (QTMT or QT+MTT) structure. The QTMT structure in ITU-T H.266 enables quadtree leaf nodes to be further partitioned by a binary tree (BT) structure. That is, in ITU-T H.266, quadtree leaf nodes may be recursively divided vertically or horizontally. Further, in ITU-T H.266, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge.

As described above, each video frame or picture may be divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTU's contained in more than one slice and a slice may consist of CTU's contained in more than one tile. However, ITU-T H.265 provides that one or both of the following conditions shall be fulfilled: (1) All CTUs in a slice belong to the same tile; and (2) All CTUs in a tile belong to the same slice.

With respect to ITU-T H.266. slices are required to consist of an integer number of complete tiles or an integer number of consecutive complete CTU rows within a tile, instead of only being required to consist of an integer number of CTUs. It should be noted that in ITU-T H.266, the slice design does not include slice segments (i.e., no independent/dependent slice segments). Thus, in ITU-T H.266, a picture may include a single tile, where the single tile is contained within a single slice or a picture may include multiple tiles where the multiple tiles (or CTU rows thereof) may be contained within one or more slices. In ITU-T H.266, the partitioning of a picture into tiles is specified by specifying respective heights for tile rows and respective widths for tile columns. Thus, in ITU-T H.266 a tile is a rectangular region of CTUs within a particular tile row and a particular tile column position. Further, it should be noted that ITU-T H.266 provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, as described in further detail below, a bitstream of coded video data includes a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 2:
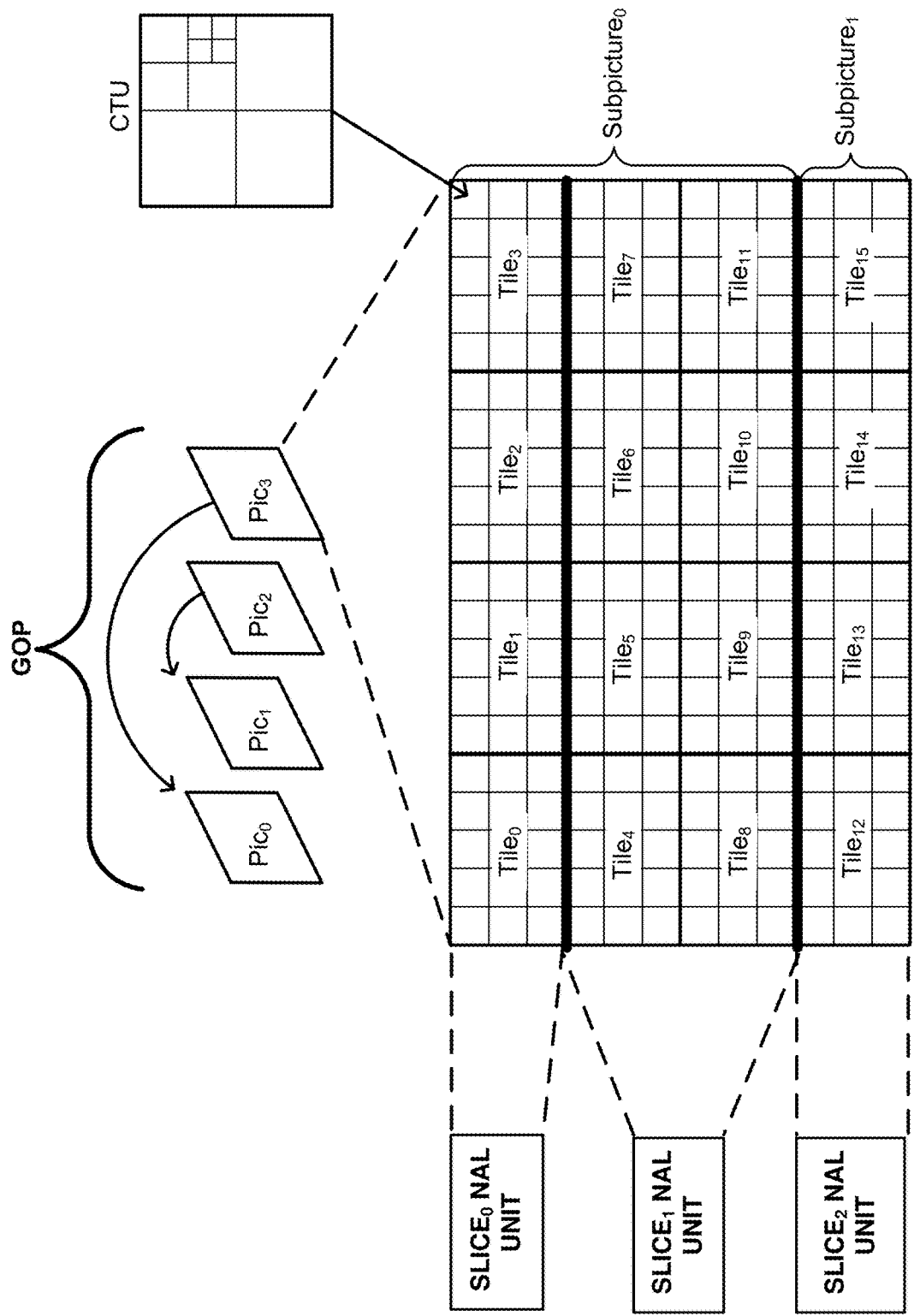
FIG. 2 is a conceptual diagram illustrating coded video data and corresponding data structures according to one or more techniques of this disclosure.

FIG. 2 is a conceptual diagram illustrating an example of a picture within a group of pictures partitioned according to tiles, slices, and subpictures. It should be noted that the techniques described herein may be applicable to tiles, slices, subpictures, sub-divisions thereof and/or equivalent structures thereto. That is, the techniques described herein may be generally applicable regardless of how a picture is partitioned into regions. For example, in some cases, the techniques described herein may be applicable in cases where a tile may be partitioned into so-called bricks, where a brick is a rectangular region of CTU rows within a particular tile. Further, for example, in some cases, the techniques described herein may be applicable in cases where one or more tiles may be included in so-called tile groups, where a tile group includes an integer number of adjacent tiles. In the example illustrated in FIG. 2, $Pic_3$ is illustrated as including 16 tiles (i.e., $Tile_0$ to $Tile_{15}$) and three slices (i.e., $Slice_0$ to $Slice_2$). In the example illustrated in FIG. 2, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 2, $Pic_3$ is illustrated as including two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By using organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and $Slice_0$ NAL unit and $Slice_1$ NAL unit may be decoded and displayed. The encapsulation of slices of a picture into respective NAL unit data structures and sub-bitstream extraction are described in further detail below.

Figure 4:
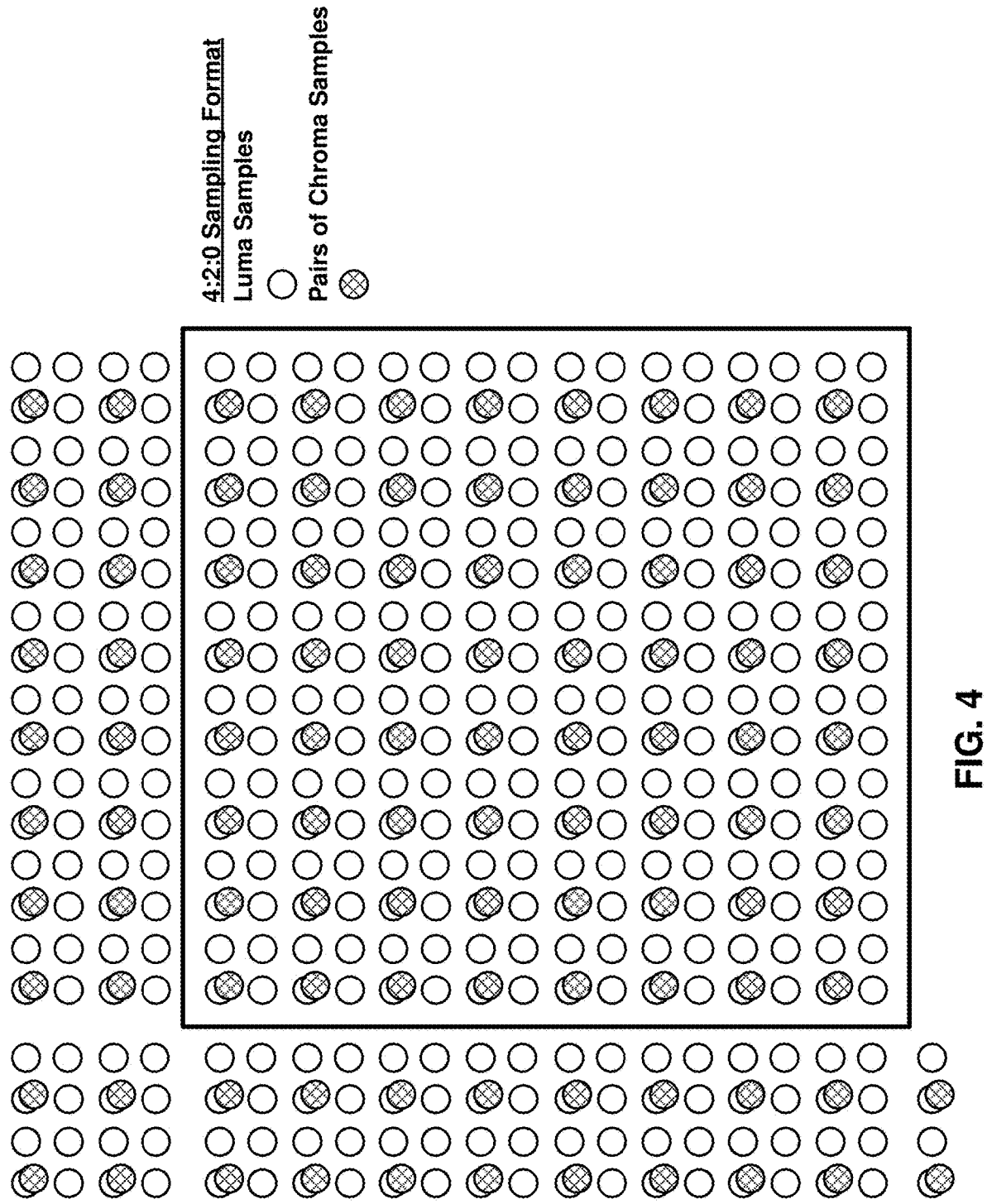
FIG. 4 is a conceptual diagram illustrating an example of a video component sampling format that may be utilized in accordance with one or more techniques of this disclosure.

As described above, a video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 4 is a conceptual diagram illustrating an example of a coding unit formatted according to a 4:2:0 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:0 sample format includes 16×16 samples of luma components and 8×8 samples for each chroma component. Further, in the example illustrated in FIG. 4, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

Table 1 illustrates how a chroma format is specified in ITU-T H.266 based on the value of syntax element chroma_format_idc. Further, Table 1 illustrates how the variables Sub WidthC and SubHeightC are specified derived depending on the chroma format. SubWidthC and SubHeightC are utilized, for example, for deblocking. With respect to Table 1, ITU-T H.266 provides the following:

In monochrome sampling there is only one sample array, which is nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling, each of the two chroma arrays has the same height and width as the luma array.

TABLE 1

| chroma_format_idc | Chroma format | SubWidthC | SubHeightC |
|---|---|---|---|
| 0 | Monochrome | 1 | 1 |
| 1 | 4:2:0 | 2 | 2 |
| 2 | 4:2:2 | 2 | 1 |
| 3 | 4:4:4 | 1 | 1 |

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In ITU-T H.266, defined possible intra-prediction modes include a planar prediction mode, a DC prediction mode, and 65 angular prediction modes. Further, in ITU-T H.266, additional intra prediction tools, such as, for example, intra subpartition mode and matrix-based intra prediction are enabled. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list. RefPicList0 and for a B slice, there may be a second independent reference picture list. RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). Further, in ITU-T H.266, the following inter prediction modes are enabled: the affine motion model, adaptive motion vector resolution, bi-directional optical flow: decoder side-motion vector refinement and geometric partitioning mode.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order. i.e., the temporal order of pictures in a video sequence. In ITU-T H.266, when a picture is decoded it is stored to a decoded picture buffer (DPB) (which may be referred to as frame buffer, a reference buffer, a reference picture buffer, or the like). In ITU-T H.266, pictures stored to the DPB are removed from the DPB when they been output and are no longer needed for coding subsequent pictures. In ITU-T H.266, a determination of whether pictures should be removed from the DPB is invoked once per picture, after decoding a slice header. i.e., at the onset of decoding a picture. For example, referring to FIG. 2. $Pic_2$ is illustrated as referencing $Pic_1$. Similarly, Pic$_3$ is illustrated as referencing $Pic_0$. With respect to FIG. 2, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0. Pic_1\}$; at the onset of decoding $Pic_2$, the DPB would include $\{Pic_0. Pic_1\}$. $Pic_2$ would then be decoded with reference to $Pic_1$ and after decoding $Pic_2$, the DPB would include $\{Pic_0, Pic_1. Pic_2\}$. At the onset of decoding $Pic_3$, pictures $Pic_0$ and $Pic_1$ would be marked for removal from the DPB, as they are not needed for decoding Pic$_3$ (or any subsequent pictures, not shown) and assuming $Pic_1$ and $Pic_2$ have been output, the DPB would be updated to include $\{Pic_0\}$. Pic$_3$ would then be decoded by referencing $Pic_0$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.266 and ITU-T H.266, a CU is associated with a transform tree structure having its root at the CU level. The transform tree is partitioned into one or more transform units (TUs). That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and subsequent secondary transforms may be applied (in the video encoder) to generate transform coefficients. For a video decoder, the order of transforms is reversed.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example. CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding. Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding. Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

As described above, video content includes video sequences comprised of a series of pictures and each picture may be divided into one or more regions. In ITU-T H.266, a coded representation of a picture comprises VCL NAL units of a particular layer within an AU and contains all CTUs of the picture. For example, referring again to FIG. 2, the coded representation of Pics is encapsulated in three coded slice NAL units (i.e., Slice$_0$ NAL unit. Slice$_1$ NAL unit, and Slice$_2$ NAL unit). It should be noted that the term video coding layer (VCL) NAL unit is used as a collective term for coded slice NAL units, i.e., VCL NAL is a collective term which includes all types of slice NAL units. As described above, and in further detail below, a NAL unit may encapsulate metadata used for decoding video data. A NAL unit encapsulating metadata used for decoding a video sequence is generally referred to as a non-VCL NAL unit. Thus, in ITU-T H.266, a NAL unit may be a VCL NAL unit or a non-VCL NAL unit. It should be noted that a VCL NAL unit includes slice header data, which provides information used for decoding the particular slice. Thus, in ITU-T H.266, information used for decoding video data, which may be referred to as metadata in some cases, is not limited to being included in non-VCL NAL units. ITU-T H.266 provides where a picture unit (PU) is a set of NAL units that are associated with each other according to a specified classification rule, are consecutive in decoding order, and contain exactly one coded picture and where an access unit (AU) is a set of PUs that belong to different layers and contain coded pictures associated with the same time for output from the DPB. ITU-T H.266 further provides where a layer is a set of VCL NAL units that all have a particular value of a layer identifier and the associated non-VCL NAL units. Further, in ITU-T H.266, a PU consists of zero or one PH NAL units, one coded picture, which comprises of one or more VCL NAL units, and zero or more other non-VCL NAL units. Further, in ITU-T H.266, a coded video sequence (CVS) is a sequence of AU's that consists, in decoding order, of a CVSS AU, followed by zero or more AU's that are not CVSS AU's, including all subsequent AU's up to but not including any subsequent AU that is a CVSS AU, where a coded video sequence start (CVSS) AU is an AU in which there is a PU for each layer in the CVS and the coded picture in each present picture unit is a coded layer video sequence start (CLVSS) picture. In ITU-T H.266, a coded layer video sequence (CLVS) is a sequence of PUs within the same layer that consists, in decoding order, of a CLVSS PU, followed by zero or more PUs that are not CLVSS PUs, including all subsequent PUs up to but not including any subsequent PU that is a CLVSS PU. This is, in ITU-T H.266, a bitstream may be described as including a sequence of AUs forming one or more CVSs.

Multi-layer video coding enables a video presentation to be decoded/displayed as a presentation corresponding to a base layer of video data and decoded/displayed one or more additional presentations corresponding to enhancement layers of video data. For example, a base layer may enable a video presentation having a basic level of quality (e.g., a High Definition rendering and/or a 30 Hz, frame rate) to be presented and an enhancement layer may enable a video presentation having an enhanced level of quality (e.g., an Ultra High Definition rendering and/or a 60 Hz, frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. Each NAL unit may include an identifier indicating a layer of video data the NAL unit is associated with. As described above, a sub-bitstream extraction process may be used to only decode and display a particular region of interest of a picture. Further, a sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream. For example, sub-bitstream extraction may be used to form a new compliant or conforming bitstream corresponding to a particular representation of video (e.g., a high quality representation).

In ITU-T H.266, each of a video sequence, a GOP, a picture, a slice, and CTU may be associated with metadata that describes video coding properties and some types of metadata are encapsulated in non-VCL NAL units. ITU-T H.266 defines parameters sets that may be used to describe video data and/or video coding properties. In particular. ITU-T H.266 includes the following four types of parameter sets: video parameter set (VPS), sequence parameter set (SPS), picture parameter set (PPS), and adaption parameter set (APS), where a SPS applies to apply to zero or more entire CVSs, a PPS applies to zero or more entire coded pictures, an APS applies to zero or more slices, and a VPS may be optionally referenced by a SPS. A PPS applies to one or more individual coded picture(s) that refers to it. In ITU-T H.266, parameter sets may be encapsulated as a non-VCL NAL unit and/or may be signaled as a message. ITU-T H.266 also includes a picture header (PH) which is encapsulated as a non-VCL NAL unit when signaled in its own NAL unit, or as part of a VCL NAL unit when signaled in the slice header of a coded slice. In ITU-T H.266, a picture header applies to all slices of a coded picture. ITU-T H.266 further enables decoding capability information (DCI) and supplemental enhancement information (SEI) messages to be signaled. In ITU-T H.266, DCI and SEI messages assist in processes related to decoding, display or other purposes, however. DCI and SEI messages may not be required for constructing the luma or chroma samples according to a decoding process. In ITU-T H.266. DCI and SEI messages may be signaled in a bitstream using non-VCL NAL units. Further, DCI and SEI messages may be conveyed by some mechanism other than by being present in the bitstream (i.e., signaled out-of-band).

Figure 3:
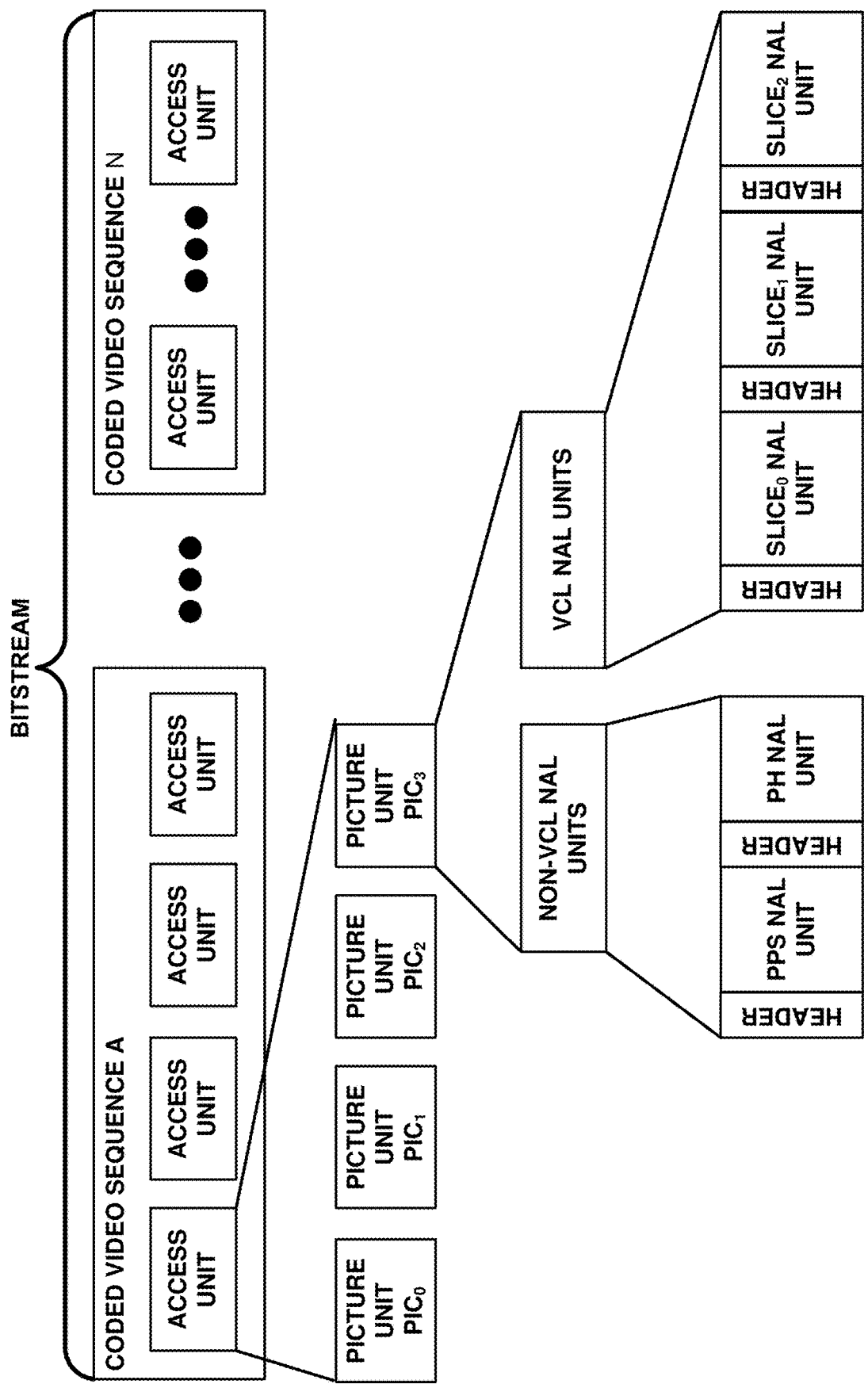
FIG. 3 is a conceptual diagram illustrating a data structure encapsulating coded video data and corresponding metadata according to one or more techniques of this disclosure.

FIG. 3 illustrates an example of a bitstream including multiple CVSs, where a CVS includes AUs, and AUs include picture units. The example illustrated in FIG. 3 corresponds to an example of encapsulating the slice NAL units illustrated in the example of FIG. 2 in a bitstream. In the example illustrated in FIG. 3, the corresponding picture unit for Pic$_3$ includes the three VCL NAL coded slice NAL units, i.e., Slice$_0$ NAL unit. Slice$_1$ NAL unit, and Slice$_2$ NAL unit and two non-VCL NAL units, i.e., a PPS NAL Unit and a PH NAL unit. It should be noted that in FIG. 3, HEADER is a NAL unit header (i.e., not to be confused with a slice header). Further, it should be noted that in FIG. 3, other non-VCL NAL units, which are not illustrated may be included in the CVSs, e.g., SPS NAL units. VPS NAL units. SEI message NAL units, etc. Further, it should be noted that in other examples, a PPS NAL Unit used for decoding $Pic_3$ may be included elsewhere in the bitstream, e.g., in the picture unit corresponding to $Pic_0$ or may be provided by an external mechanism. In ITU-T H.266, a PH syntax structure may be present in the slice header of a VCL NAL unit or in a PH NAL unit of the current PU.

With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.
x/y Used to denote division in mathematical equations where no truncation or rounding is intended.

Further, the following mathematical functions may be used:

Log2 (x) the base-2 logarithm of x;

$$\text{Min}(x, y) = \begin{cases} x & ; \ x <= y \\ y & ; \ x > y \end{cases};$$

$$\text{Max}(x, y) = \begin{cases} x & ; \ x >= y \\ y & ; \ x < y \end{cases}$$

Ceil (x) the smallest integer greater than or equal to x.

With respect to the example syntax used herein, the following definitions of logical operators may be applied:
x && y Boolean logical "and" of x and y
x||y Boolean logical "or" of x and y!
! Boolean logical "not"
x? y: z If x is TRUE or not equal to 0, evaluates to the value of y; otherwise, evaluates to the value of z.

Further, the following relational operators may be applied:
> Greater than
>= Greater than or equal to
< Less than
<= Less than or equal to
== Equal to
!= Not equal to Further, it should be noted that in the syntax descriptors used herein, the following descriptors may be applied:

b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

i(n): signed integer using n bits. When n is "v" in the syntax table, the number of bits varies in a manner dependent on the value of other syntax elements. The parsing process for this descriptor is specified by the return value of the function read_bits(n) interpreted as a two's complement integer representation with most significant bit written first.

se(v): signed integer 0-th order Exp-Golomb-coded syntax element with the left bit first.

tb(v): truncated binary using up to max Val bits with max Val defined in the semantics of the symtax element.

tu(v): truncated unary using up to max Val bits with max Val defined in the semantics of the symtax element.

u(n): unsigned integer using n bits. When n is "v" in the syntax table, the number of bits varies in a manner dependent on the value of other syntax elements. The parsing process for this descriptor is specified by the return value of the function read_bits(n) interpreted as a binary representation of an unsigned integer with most significant bit written first.

ue(v): unsigned integer 0-th order Exp-Golomb-coded syntax element with the left bit first.

As described above, for inter prediction, reference picture lists are utilized. Table 2 illustrates the reference picture lists syntax provided in ITU-T H.266 and Table 3 illustrates the reference picture lists structure syntax provided in ITU-T H.266.

TABLE 2

| | Descriptor |
|---|---|
| ref_pic_lists( ) { | |
|   for(i = 0; i < 2; i++ ) { | |
|     if( sps_num_ref_pic lists[ i ] > 0 && | |
|       (i = = 0 \|\| (i = = 1 && pps_rpl1_idx_present_flag ) ) ) | |
|     rpl_sps_flag[ i ] | u(1) |
|   if( rpl_sps_flag[ i ] ) { | |
|     if( sps_num_ref_pic_lists[ i ] > 1 && | |
|       ( i = = 0 \|\| (i = = 1 && pps_rpl1_idx_present_flag ) ) ) | |
|     rpl_idx[ i ] | u(v) |
|   } else | |
|     ref_pic_list_struct( i, sps_num_ref_pic_lists[ i ] ) | |
|   for( j = 0; j < NumLtrpEntries[ i ][ RplsIdx[ i ] ]; j++ ) { | |
|     if( ltrp_in_header_flag[ i ][ RplsIdx[ i ] ] ) | |
|       poc_lsb_lt[ i ][ j ] | u(v) |
|     delta_poc_msb_cycle_present_flag[ i ][ j ] | u(1) |

TABLE 2-continued

|  | Descriptor |
|---|---|
|       if( delta_poc_msb_cycle_present_flag[ i ][ j ] ) | |
|         delta_poc_msb_cycle_lt[ i ][ j ] | ue(v) |
|     } | |
|   } | |
| } | |

TABLE 3

|  | Descriptor |
|---|---|
| ref_pic_list_struct( listIdx, rplsIdx ) { | |
|   num_ref_entries[ listIdx ][ rplsIdx ] | ue(v) |
|   if( sps_long_term_ref_pics_flag && rplsIdx < sps_num_ref_pic_lists[ listIdx ] && | |
|       num_ref_entries[ listIdx ][ rplsIdx ] > 0 ) | |
|     ltrp_in_header_flag[ listIdx ][ rplsIdx ] | u(1) |
|   for( i = 0, j = 0; i < num_ref_entries[ listIdx ][ rplsIdx ]; i++) { | |
|     if( sps_inter_layer_prediction_enabled_flag ) | |
|       inter_layer_ref_pic_flag[ listIdx ][ rplsIdx ][ i ] | u(1) |
|     if( !inter_layer_ref_pic_flag[ listIdx ][ rplsIdx ][ i ] ) { | |
|       if( sps_long_term_ref_pics_flag ) | |
|         st_ref_pic_flag[ listIdx ][ rplsIdx ][ i ] | u(1) |
|       if( st_ref_pic_flag[ listIdx ][ rplsIdx ][ i ] ) { | |
|         abs_delta_poc_st[ listIdx ][ rplsIdx ][ i ] | ue(v) |
|         if( AbsDeltaPocSt[ listIdx ][ rplsIdx ][ i ] > 0 ) | |
|           strp_entry_sign_flag[ listIdx ][ rplsIdx ][ i ] | u(1) |
|       } else if( !ltrp_in_header_flag[ listIdx ][ rplsIdx ] ) | |
|         rpls_poc_lsb_lt[ listIdx ][ rplsIdx ][ j++ ] | u(v) |
|     } else | |
|       ilrp_idx[ listIdx ][ rplsIdx ][ i ] | ue(v) |
|   } | |
| } | |

With respect to Table 2, ITU-T H.266 provides the following semantics:

The ref_pic_lists( ) syntax structure could be present in the PH syntax structure or the slice header.

rpl_sps_flag[i] equal to 1 specifies that RPL i in ref_pic_lists( ) is derived based on one of the ref_pic_list_struct(listIdx, rplsIdx) syntax structures with listIdx equal to i in the SPS. rpl_sps_flag[i] equal to 0 specifies that RPL i of the picture is derived based on the ref_pic_list_struct(listIdx, rplsIdx) syntax structure with listIdx equal to i that is directly included in ref_pic_lists( )

When rpl_sps_flag[i] is not present, it is inferred as follows:

If sps_num_ref_pic_lists[i] is equal to 0, the value of rpl_sps_flag[i] is inferred to be equal to 0.

Otherwise (sps_num_ref_pic_lists[i] is greater than 0), when pps_rpl1_idx_present_flag is equal to 0 and i is equal to 1, the value of rpl_sps_flag[1] is inferred to be equal to rpl_sps_flag[0].

rpl_idx[i] specifies the index, into the list of the ref_pic_list_struct(listIdx, rplsIdx) syntax structures with listIdx equal to i included in the SPS, of the ref_pic_list_struct(listIdx, rplsIdx) syntax structure with listIdx equal to i that is used for derivation of RPL i of the current picture or slice. The syntax element rpl_idx[i] is represented by Ceil(Log 2(sps_num_ref_pic_lists[i])) bits.

When rpl_sps_flag[i] is equal to 1 and sps_num_ref_pic_lists[i] is equal to 1, the value of rpl_idx[i] is inferred to be equal to 0. When rpl_sps_flag[1] is equal to 1 and pps_rpl1_idx_present_flag is equal to 0, the value of rpl_idx[1] is inferred to be equal to rpl_idx[0].

The value of rpl_idx[i] shall be in the range of 0 to sps_num_ref_pic_lists[i]−1, inclusive.

The Variable RplsIdx[i] is Derived as Follows:
RplsIdx[i]=rpl_sps_flag[i]? rpl_idx[i]: sps_num_ref_pic_lists[i]

When pps_rpl_info_in_ph_flag is equal to 1 and ph_inter_slice_allowed_flag is equal to 1, the value of num_ref_entries[0][RplsIdx[0]] shall be greater than 0.

poc_lsb_lt[i][j] specifies the value of the picture order count modulo MaxPicOrderCntLsb of the j-th LTRP entry in the i-th RPL in the ref_pic_lists( ) syntax structure. The length of the poc_lsb_lt[i][j] syntax element is sps_log 2_max_pic_order_cnt_lsb_minus4+4 bits.

The Variable PocLsbLt [i][j] is Derived as Follows:
PocLsbLt [i][j]=ltrp_in_header_flag[i][RplsIdx[i]]? poc_lsb_lt[i][j]: rpls_poc_lsb_lt[i][RplsIdx[i]][j]

delta_poc_msb_cycle_present_flag[i][j] equal to 1 specifies that delta_poc_msb_cycle_lt[i][j] is present.

delta_poc_msb_cycle_present_flag[i][j] equal to 0 specifies that delta_poc_msb_cycle_lt[i][j] is not present.

Let prevTid0Pic be the previous picture in decoding order that has nuh_layer_id the same as the slice or picture header referring to the ref_pic_lists( ) syntax structure, has TemporalId and ph_non_ref_pic_flag both equal to 0, and is not a RASL or RADL picture. Let setOfPrevPocVals be a set consisting of the following:

the PicOrderCntVal of prevTid0Pic, the PicOrderCntVal of each picture that is referred to by entries in RefPicList[0] or RefPicList[1] of prevTid0Pic and has nuh_layer_id the same as the current picture, the PicOrderCntVal of each picture that follows prevTid0Pic in decoding order, has nuh_layer_id the same as the current picture, and precedes the current picture in decoding order.

When there is more than one value in setOfPrevPocVals for which the value modulo MaxPicOrderCntLsb is equal to PocLsbLt [i][j], the value of delta_poc_msb_cycle_present_flag[i][j] shall be equal to 1.

delta_poc_msb_cycle_lt[i][j] specifies the value of the variable FullPocLt[i][j] as follows:
if (j==0)
deltaPocMsbCycleLt[i][j]=delta_poc_msb_cycle_lt[i][j]
else
deltaPocMsbCycleLt[i][j]=delta_poc_msb_cycle_lt[i][j]+deltaPocMsbCycleLt[i][j−1]
FullPocLt[i][j]=PicOrderCntVal−deltaPocMsbCycleLt[i][j] *MaxPicOrderCntLsb−(PicOrderCntVal & (MaxPicOrderCntLsb−1))+PocLsbLt [i][j]

The value of delta_poc_msb_cycle_lt[i][j] shall be in the range of 0 to $2^{(32-sps\_log\,2\_max\_pie\_order\_cnt\_lsb\_minus4-4)}$ inclusive. When not present, the value of delta_poc_msb_cycle_lt [i][j] is inferred to be equal to 0.

with Respect to Table 3, ITU-T H.266 Provides the Following Semantics:

The ref_pic_list_struct(listIdx, rplsIdx) syntax structure could be present in an SPS, in a PH syntax structure, or in a slice header. Depending on whether the syntax structure is included in an SPS, a PH syntax structure, or a slice header, the following applies:

If present in a PH syntax structure or slice header, the ref_pic_list_struct(listIdx, rplsIdx) syntax structure specifies RPL listIdx of the current picture (i.e., the coded picture containing the PH syntax structure or slice header).

Otherwise (present in an SPS), the ref_pic_list_struct (listIdx, rplsIdx) syntax structure specifies a candidate for RPL listIdx, and the term "the current picture" in the semantics specified in the remainder of this clause refers to each picture that 1) has a PH syntax structure or one or more slices containing rpl_idx[listIdx] equal to an index into the list of the ref_pic_list_struct(listIdx, rplsIdx) syntax structures included in the SPS, and 2) is in a CLVS that refers to the SPS.

num_ref_entries[listIdx][rplsIdx] specifies the number of entries in the ref_pic_list_struct(listIdx, rplsIdx) syntax structure. The value of num_ref_entries[listIdx][rplsIdx] shall be in the range of 0 to MaxDpbSize+13, inclusive, where MaxDpbSize is as specified.

ltrp_in_header_flag[listIdx][rplsIdx] equal to 0 specifies that the POC LSBs of the LTRP entries indicated in the ref_pic_list_struct(listIdx, rplsIdx) syntax structure are present in the same syntax structure. ltrp_in_header_flag[listIdx][rplsIdx] equal to 1 specifies that the POC LSBs of the LTRP entries indicated in the ref_pic_list_struct(listIdx, rplsIdx) syntax structure are not present in the same syntax structure. When sps_long_term_ref_pics_flag is equal to 1 and rplsIdx is equal to sps_num_ref_pic_lists[listIdx], the value of ltrp_in_header_flag[listIdx][rplsIdx] is inferred to be equal to 1.

inter_layer_ref_pic_flag[listIdx][rplsIdx][i] equal to 1 specifies that the i-th entry in the ref_pic_list_struct (listIdx, rplsIdx) syntax structure is an ILRP entry. inter_layer_ref_pic_flag[listIdx][rplsIdx][i] equal to 0 specifies that the i-th entry in the ref_pic_list_struct (listIdx, rplsIdx) syntax structure is not an ILRP entry. When not present, the value of inter_layer_ref_pic_flag [listIdx][rplsIdx][i] is inferred to be equal to 0.

st_ref_pic_flag[listIdx][rplsIdx][i] equal to 1 specifies that the i-th entry in the ref_pic_list_struct(listIdx, rplsIdx) syntax structure is an STRP entry. st_ref_pic_flag[listIdx][rplsIdx][i] equal to 0 specifies that the i-th entry in the ref_pic_list_struct(listIdx, rplsIdx) syntax structure is an LTRP entry. When inter_layer_ref_pic_flag[listIdx][rplsIdx][i] is equal to 0 and st_ref_pic_flag [listIdx][rplsIdx][i] is not present, the value of st_ref_pic_flag[listIdx][rplsIdx][i] is inferred to be equal to 1.

The Variable NumLtrpEntries[listIdx][rplsIdx] is Derived as Follows:
for (i=0, NumLtrpEntries[listIdx][rplsIdx]=0; i<num_ref_entries[listIdx][rplsIdx]; i++)
if (!inter_layer_ref_pic_flag[listIdx][rplsIdx][i] &&!st_ref_pic_flag[listIdx][rplsIdx][i])
NumLtrpEntries[listIdx][rplsIdx]++ abs_delta_poc_st[listIdx][rplsIdx][i] specifies the value of the variable AbsDeltaPocSt[listIdx][rplsIdx][i] as follows:
if ((sps_weighted_pred_flag||sps_weighted_bipred_flag) && i!=0)
AbsDeltaPocSt[listIdx][rplsIdx][i]=abs_delta_poc_st[listIdx][rplsIdx][i] else
AbsDeltaPocSt[listIdx][rplsIdx][i]=abs_delta_poc_st[listIdx][rplsIdx][i]+1

The value of abs_delta_poc_st[listIdx][rplsIdx][i] shall be in the range of 0 to 215-1, inclusive.

strp_entry_sign_flag[listIdx][rplsIdx][i] equal to 0 specifies that DeltaPocValSt[listIdx][rplsIdx] is greater than or equal to 0. strp_entry_sign_flag[listIdx][rplsIdx][i] equal to 1 specifies that DeltaPocValSt[listIdx][rplsIdx] is less than 0. When not present, the value of strp_entry_sign_flag[listIdx][rplsIdx][i] is inferred to be equal to 0.

The List DeltaPocValSt[listIdx][rplsIdx] is Derived as Follows:
for (i=0; i<num_ref_entries[listIdx][rplsIdx]; i++)
if (!inter_layer_ref_pic_flag[listIdx][rplsIdx][i] && st_ref_pic_flag[listIdx][rplsIdx][i])
DeltaPocValSt [listIdx][rplsIdx][i]=(1-2*strp_entry_sign_flag[listIdx][rplsIdx][i])*AbsDeltaPocSt[listIdx][rplsIdx][i] rpls_poc_lsb_lt [listIdx][rplsIdx][i] specifies the value of the picture order count modulo MaxPicOrderCntLsb of the picture referred to by the i-th entry in the ref_pic_list_struct(listIdx, rplsIdx) syntax structure. The length of the
rpls_poc_lsb_lt[listIdx][rplsIdx][i] syntax element is sps_log 2_max_pic_order_cnt_lsb_minus4+4 bits.

ilrp_idx[listIdx][rplsIdx][i] specifies the index, to the list of the direct reference layers, of the ILRP entry of the i-th entry in the ref_pic_list_struct(listIdx, rplsIdx) syntax structure. The value of ilrp_idx[listIdx][rplsIdx] [i] shall be in the range of 0 to NumDirectRefLayers [GeneralLayerIdx[nuh_layer_id]]−1, inclusive.

Further, ITU-T H.266 Provides the Following Process from Reference Picture List Construction:

The RPLs RefPicList[0] and RefPicList[1], the reference picture scaling ratios RefPicScale[i][j][0] and RefPicScale [i][j][1], and the reference picture scaled flags RprConstraintsActiveFlag[0][j] and RprConstraintsActiveFlag[1][j] are derived as follows:

```
for( i = 0; i < 2; i++ ) {
    for( j = 0, k = 0, pocBase = PicOrderCntVal; j < num_ref_entries[ i ][ RplsIdx[ i ] ]; j++) {
        if( !inter_layer_ref_pic_flag[ i ][ RplsIdx[ i ] ][ j ] ) {
            if( st_ref_pic_flag[ i ][ RplsIdx[ i ] ][ j ] ) {
                RefPicPocList[ i ][ j ] = pocBase + DeltaPoc ValSt[ i ][ RplsIdx[ i ] ][ j ]
                if( there is a reference picture picA in the DPB with the same nuh_layer_id as the current
picture and PicOrderCntVal equal to RefPicPocList[ i ][ j ] )
                    RefPicList[ i ][ j ] = picA
                else
                    RefPicList[ i ][ j ] = "no reference picture"
                pocBase = RefPicPocList[ i ][ j ]
            } else {
                if( !delta_poc_msb_cycle_present_flag[ i ][ k ] ) {
                    if( there is a reference picA in the DPB with the same nuh_layer_id as the current picture
and PicOrderCntVal & ( MaxPicOrderCntLsb − 1 ) equal to PocLsbLt[ i ][ k ] )
                        RefPicList[ i ][ j ] = picA
                    else
                        RefPicList[ i ][ j ] = "no reference picture"
                    RefPicLtPocList[ i ][ j ] = PocLsbLt[ i ][ k ]
                } else {
                    if( there is a reference picA in the DPB with the same nuh_layer_id as the current picture
and PicOrderCntVal equal to FullPocLt[ i ][ k ] )
                        RefPicList[ i ][ j ] = picA
                    else
                        RefPicList[ i ][ j ] = "no reference picture"
                    RefPicLtPocList[ i ][ j ] = FullPocLt[ i ][ k ]
                }
                k++
            }
        } else {
            layerIdx = DirectRefLayerIdx[ GeneralLayerIdx[ nuh_layer_id ] ][ ilrp_idx[ i ][ RplsIdx[ i ] ][ j ] ]
            refPicLayerId = vps_layer_id[ layerIdx ]
            if( there is a reference picture picA in the DPB with nuh_layer_id equal to refPicLayerId and
                the same PicOrderCntVal as the current picture )
                RefPicList[ i ][ j ] = picA
            else
                RefPicList[ i ][ j ] = "no reference picture"
        }
        fRefWidth is set equal to CurrPicScalWinWidthL of the reference picture RefPicList[ i ][ j ]
        fRefHeight is set equal to CurrPicScalWinHeightL of the reference picture RefPicList[ i ][ j ]
        refPicWidth, refPicHeight, refScaling WinLeftOffset, refScaling WinRightOffset,
refScalingWinTopOffset,and refScalingWinBottomOffset, are set equal to the values of
pps_pic_width_in_luma_samples, pps_pic_height_in_luma_samples, pps_scaling_win_left_offset,
pps_scaling_win_right_offset, pps_scaling_win_top_offset, and pps_scaling_win_bottom_offset,
respectively, of the reference picture RefPicList[ i ][ j ]
        fRefNumSubpics is set equal to sps_num_subpics_minus1 of the reference picture RefPicList[ i ][ j ]
        RefPicScale[ i ][ j ][ 0 ] = ( ( fRefWidth << 14 ) + ( CurrPicScalWin WidthL >> 1 ) ) /
            CurrPicScalWin WidthL
        RefPicScale[ i ][ j ][ 1 ] = ( ( fRefHeight << 14 ) + ( CurrPicScalWinHeightL >> 1 ) ) /
            CurrPicScalWinHeightL
        RprConstraints ActiveFlag[ i ][ j ] = ( pps_pic_width_in_luma_samples != refPicWidth | |
            pps_pic_height_in_luma_samples != refPicHeight
            pps_scaling_win_left_offset != refScaling WinLeftOffset
            pps_scaling_win_right_offset != refScaling WinRightOffset
            pps_scaling_win_top_offset != refScaling WinTopOffset
            pps_scaling_win_bottom_offset != refScaling WinBottomOffset
            sps_num_subpics_minus1 != fRefNumSubpics )
    }
}
```

For each i equal to 0 or 1, the first NumRefIdxActive[i] entries in RefPicList[i] are referred to as the active entries in RefPicList[i], and the other entries in RefPicList[i] are referred to as the inactive entries in RefPicList[i].

Where, in ITU-T H.266, the following syntax element is provided in the NAL unit header:

nuh_layer_id specifies the identifier of the layer to which a VCL NAL unit belongs or the identifier of a layer to which a non-VCL NAL unit applies. The value of nuh_layer_id shall be in the range of 0 to 55, inclusive. Other values for nuh_layer_id are reserved for future use by ITU-T|ISO/IEC. Although the value of nuh_layer_id is required to be the range of 0 to 55, inclusive, in this version of this Specification, decoders conforming to this version of this Specification shall allow the value of nuh_layer_id to be greater than 55 to appear in the syntax and shall ignore (i.e. remove from the bitstream and discard) NAL units with nuh_layer_id greater than 55.

The value of nuh_layer_id shall be the same for all VCL NAL units of a coded picture. The value of nuh_layer_id of a coded picture or a PU is the value of the nuh_layer_id of the VCL NAL units of the coded picture or the PU. When nal_unit_type is equal to PH_NUT, or FD_NUT, nuh_layer_id shall be equal to the nuh_layer_id of associated VCL NAL unit.

When nal_unit_type is equal to EOS_NUT, nuh_layer_id shall be equal to one of the nuh_layer_id values of the layers present in the CVS.

where, in ITU-T H.266, the Following Syntax Element is Provided in the VPS:

vps_layer_id[i] specifies the nuh_layer_id value of the i-th layer. For any two non-negative integer values of m and n, when m is less than n, the value of vps_layer_id[m] shall be less than vps_layer_id[n].

Where, in ITU-T H.266, the following syntax element is provided in the SPS:

sps_ref_pic_resampling_enabled_flag equal to 1 specifies that reference picture resampling is enabled and a current picture referring to the SPS might have slices that refer to a reference picture in an active entry of an RPL that has one or more the 1) of following seven parameters different than that of the current picture: pps_pic_width_in_luma_samples, 2) pps_pic_height_in_luma_samples, 3) pps_scaling_win_left_offset, 4) pps_scaling_win_right_offset, 5) pps_scaling_win_top_offset, 6) pps_scaling_win_bottom_offset, and 7) sps_num_subpics_minus1. sps_ref_pic_resampling_enabled_flag equal to 0 specifies that reference picture resampling is disabled and no current picture referring to the SPS has slices that refer to a reference picture in an active entry of an RPL that has one or more of these seven parameters different than that of the current picture.

NOTE—When sps_ref_pic_resampling_enabled_flag is equal to 1, for a current picture the reference picture that has one or more of these seven parameters different than that of the current picture could either belong to the same layer or a different layer than the layer containing the current picture.

sps_res_change_in_clvs_allowed_flag equal to 1 specifies that the picture spatial resolution might change within a CLVS referring to the SPS. sps_res_change_in_clvs_allowed_flag equal to 0 specifies that the picture spatial resolution does not change within any CLVS referring to the SPS. When not present, the value of sps_res_change_in_clvs_allowed_flag is inferred to be equal to 0.

sps_pic_width_max_in_luma_samples specifies the maximum width, in units of luma samples, of each decoded picture referring to the SPS. sps_pic_width_max_in_luma_samples shall not be equal to 0 and shall be an integer multiple of Max (8, MinCbSizeY).

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_pic_width_max_in_luma_samples shall be less than or equal to the value of vps_ols_dpb_pic_width[i].

sps_pic_height_max_in_luma_samples specifies the maximum height, in units of luma samples, of each decoded picture referring to the SPS. sps_pic_height_max_in_luma_samples shall not be equal to 0 and shall be an integer multiple of Max (8, MinCbSizeY).

When sps_video_parameter_set_id is greater than 0 and the SPS is referenced by a layer that is included in the i-th multi-layer OLS specified by the VPS for any i in the range of 0 to NumMultiLayerOlss−1, inclusive, it is a requirement of bitstream conformance that the value of sps_pic_height_max_in_luma_samples shall be less than or equal to the value of vps_ols_dpb_pic_height[i].

sps_conformance_window_flag equal to 1 indicates that the conformance cropping window offset parameters follow next in the SPS. sps_conformance_window_flag equal to 0 indicates that the conformance cropping window offset parameters are not present in the SPS.

sps_conf_win_left_offset, sps_conf_win_right_offset, sps_conf_win_top_offset, and sps_conf_win_bottom_offset specify the cropping window that is applied to pictures with pps_pic_width_in_luma_samples equal to sps_pic_width_max_in_luma_samples and pps_pic_height_in_luma_samples equal to sps_pic_height_max_in_luma_samples. When sps_conformance_window_flag is equal to 0, the values of sps_conf_win_left_offset, sps_conf_win_right_offset, sps_conf_win_top_offset, and sps_conf_win_bottom_offset are inferred to be equal to 0.

The conformance cropping window contains the luma samples with horizontal picture coordinates from SubWidthC*sps_conf_win_left_offset to sps_pic_width_max_in_luma_samples−(SubWidthC*sps_conf_win_right_offset+1) and vertical picture coordinates from SubHeightC*sps_conf_win_top_offset to sps_pic_height_max_in_luma_samples−(SubHeightC*sps_conf_win_bottom_offset+1), inclusive.

The value of SubWidthC*(sps_conf_win_left_offset+sps_conf_win_right_offset) shall be less than sps_pic_width_max_in_luma_samples, and the value of SubHeightC*(sps_conf_win_top_offset+sps_conf_win_bottom_offset) shall be less than sps_pic_height_max_in_luma_samples.

When sps_chroma_format_idc is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

sps_subpic_info_present_flag equal to 1 specifies that subpicture information is present for the CLVS and there might be one or more than one subpicture in each picture of the CLVS. sps_subpic_info_present_flag equal to 0 specifies that subpicture information is not present for the CLVS and there is only one subpicture in each picture of the CLVS.

When sps_res_change_in_clvs_allowed_flag is equal to 1, the value of sps_subpic_info_present_flag shall be equal to 0.

NOTE—When a bitstream is the result of a subpicture sub-bitstream extraction process and contains only a subset of the subpictures of the input bitstream to the subpicture sub-bitstream extraction process, it might be required to set the value of sps_subpic_info_present_flag equal to 1 in the RBSP of the SPSs.

sps_num_subpics_minus1 plus 1 specifies the number of subpictures in each picture in the CLVS. The value of sps_num_subpics_minus1 shall be in the range of 0 to MaxSlicesPerAu−1, inclusive, where MaxSlicesPerAu is specified. When not present, the value of sps_num_subpics_minus1 is inferred to be equal to 0.

Where, in ITU-T H.266, the Following Syntax Element is Provided in the PPS:

pps_pic_width_in_luma_samples specifies the width of each decoded picture referring to the PPS in units of luma samples. pps_pic_width_in_luma_samples shall not be equal to 0, shall be an integer multiple of Max (8, MinCbSizeY), and shall be less than or equal to sps_pic_width_max_in_luma_samples.

When sps_res_change_in_clvs_allowed_flag equal to 0, the value of pps_pic_width_in_luma_samples shall be equal to sps_pic_width_max_in_luma_samples.

When sps_ref_wraparound_enabled_flag is equal to 1, the value of (CtbSizeY/MinCbSizeY+1) shall be less than or equal to the value of (pps_pic_width_in_luma_samples/MinCbSizeY−1).

pps_pic_height_in_luma_samples specifies the height of each decoded picture referring to the PPS in units of luma samples. pps_pic_height_in_luma_samples shall not be equal to 0 and shall be an integer multiple of Max (8, MinCbSizeY), and shall be less than or equal to sps_pic_height_max_in_luma_samples.

When sps_res_change_in_clvs_allowed_flag equal to 0, the value of pps_pic_height_in_luma_samples shall be equal to sps_pic_height_max_in_luma_samples.

The variables Pic WidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

PicWidthInCtbsY=Ceil (pps_pic_width_in_luma_samples÷CtbSizeY)
PicHeightInCtbsY=Ceil (pps_pic_height_in_luma_samples÷CtbSizeY)
PicSizeInCtbsY=PicWidthInCtbsY*PicHeightInCtbsY
PicWidthInMinCbsY=pps_pic_width_in_luma_samples/MinCbSizeY
PicHeightInMinCbsY=pps_pic_height_in_luma_samples/MinCbSizeY
PicSizeInMinCbsY=PicWidthInMinCbsY*PicHeightInMinCbsY
PicSizeInSamplesY=pps_pic_width_in_luma_samples*pps_pic_height_in_luma_samples
PicWidthInSamplesC=pps_pic_width_in_luma_samples/Sub WidthC
PicHeightInSamplesC=pps_pic_height_in_luma_samples/SubHeightC pps_conformance_window_flag equal to 1 specifies that the conformance cropping window offset parameters follow next in the PPS. pps_conformance_window_flag equal to 0 specifies that the conformance cropping window offset parameters are not present in the PPS.

When pps_pic_width_in_luma_samples is equal to sps_pic_width_max_in_luma_samples and pps_pic_height_in_luma_samples is equal to sps_pic_height_max_in_luma_samples, the value of pps_conformance_window_flag shall be equal to 0.

pps_conf_win_left_offset, pps_conf_win_right_offset, pps_conf_win_top_offset, and pps_conf_win_bottom_offset specify the samples of the pictures in the CLVS that are output from the decoding process, in terms of a rectangular region specified in picture coordinates for output.

When Pps_Conformance_Window_Flag is Equal to 0, the Following Applies:

If pps_pic_width_in_luma_samples is equal to sps_pic_width_max_in_luma_samples and pps_pic_height_in_luma_samples is equal to sps_pic_height_max_in_luma_samples, the values of pps_conf_win_left_offset, pps_conf_win_right_offset, pps_conf_win_top_offset, and pps_conf_win_bottom_offset are inferred to be equal to sps_conf_win_left_offset, sps_conf_win_right_offset, sps_conf_win_top_offset, and sps_conf_win_bottom_offset, respectively.

Otherwise, the values of pps_conf_win_left_offset, pps_conf_win_right_offset, pps_conf_win_top_offset, and pps_conf_win_bottom_offset are inferred to be equal to 0.

The conformance cropping window contains the luma samples with horizontal picture coordinates from SubWidthC*pps_conf_win_left_offset to pps_pic_width_in_luma_samples−(SubWidthC*pps_conf_win_right_offset+1) and vertical picture coordinates from SubHeightC*pps_conf_win_top_offset to pps_pic_height_in_luma_samples−(SubHeightC*pps_conf_win_bottom_offset+1), inclusive.

The value of SubWidthC*(pps_conf_win_left_offset+pps_conf_win_right_offset) shall be less than pps_pic_width_in_luma_samples, and the value of SubHeightC*(pps_conf_win_top_offset+pps_conf_win_bottom_offset) shall be less than pps_pic_height_in_luma_samples.

When sps_chroma_format_idc is not equal to 0, the corresponding specified samples of the two chroma arrays are the samples having picture coordinates (x/SubWidthC, y/SubHeightC), where (x, y) are the picture coordinates of the specified luma samples.

NOTE—The conformance cropping window offset parameters are only applied at the output. All internal decoding processes are applied to the uncropped picture size.

Let ppsA and ppsB be any two PPSs referring to the same SPS. It is a requirement of bitstream conformance that, when ppsA and ppsB have the same the values of pps_pic_width_in_luma_samples and pps_pic_height_in_luma_samples, respectively, ppsA and ppsB same shall have the values of pps_conf_win_left_offset, pps_conf_win_right_offset, pps_conf_win_top_offset, and pps_conf_win_bottom_offset, respectively.

pps_scaling_window_explicit_signalling_flag equal to 1 specifies that the scaling window offset parameters are present in the PPS. pps_scaling_window_explicit_signalling_flag equal to 0 specifies that the scaling window offset parameters are not present in the PPS. When sps_ref_pic_resampling_enabled_flag is equal to 0, the value of pps_scaling_window_explicit_signalling_flag shall be equal to 0.

pps_scaling_win_left_offset, pps_scaling_win_right_offset, pps_scaling_win_top_offset, and pps_scaling_win_bottom_offset specify the offsets that are applied to the picture size for scaling ratio calculation. When not present, values the of pps_scaling_win_left_offset, pps_scaling_win_right_offset, pps_scaling_win_top_offset, and pps_scaling_win_bottom_offset are inferred to be equal to pps_conf_win_left_offset, pps_conf_win_right_offset, pps_conf_win_top_offset, and pps_conf_win_bottom_offset, respectively.

The values of SubWidthC*pps_scaling_win_left_offset and SubWidthC*pps_scaling_win_right_offset shall both be greater than or equal to −pps_pic_width_in_luma_samples*15 and less than pps_pic_width_in_luma_samples. The values of SubHeightC* pps_scaling_win_top_offset and SubHeightC*pps_scaling_win_bottom_offset shall both be greater than or equal to −pps_pic_height_in_luma_samples*15 and less than pps_pic_height_in_luma_samples.

The value of SubWidthC*(pps_scaling_win_left_offset+pps_scaling_win_right_offset) shall be greater than or equal to −pps_pic_width_in_luma_samples*15 and less than pps_pic_width_in_luma_samples, and the value of SubHeightC*(pps_scaling_win_top_offset+pps_scaling_win_bottom_offset) shall be greater than or equal to −pps_pic_height_in_luma_samples*15 and less than pps_pic_height_in_luma_samples.

The Variables CurrPicScalWinWidthL and CurrPicScalWinHeightL are Derived as Follows:

CurrPicScalWinWidthL=pps_pic_width_in_luma_samples−SubWidthC*(pps_scaling_win_right_offset+pps_scaling_win_left_offset)

CurrPicScalWinHeightL=pps_pic_height_in_luma_samples−SubHeightC*(pps_scaling_win_bottom_offset+pps_scaling_win_top_offset)

Let refPicScalWinWidthL and refPicScalWinHeightL be the CurrPicScalWinWidthL and CurrPicScalWinHeightL, respectively, of a reference picture of a current picture referring to this PPS. It is a requirement of bitstream conformance that all of the following conditions shall be satisfied:

CurrPicScalWinWidthL*2 is greater than or equal to refPicScalWinWidthL.

CurrPicScalWinHeightL*2 is greater than or equal to refPicScalWinHeightL.

CurrPicScalWinWidthL is less than or equal to refPicScalWinWidthL*8.

CurrPicScalWinHeightL is less than or equal to refPicScalWinHeightL*8.

CurrPicScalWinWidthL*sps_pic_width_max_in_luma_samples is greater than or equal to refPicScalWinWidthL*(pps_pic_width_in_luma_samples−Max (8, MinCbSizeY)).

CurrPicScalWinHeightL*sps_pic_height_max_in_luma_samples is greater than or equal to refPicScalWinHeightL*(pps_pic_height_in_luma_samples−Max (8, MinCbSizeY)).

Thus, as provided above, ITU-T H.266 reference picture resampling (RPR) may enabled, where a current picture refers to a reference picture having a different resolution than the current picture. Reference picture resampling may be used for adaptively changing resolution within a Coded Layer Video Sequence (CLVS). Typically, reference picture resampling is used for downsampling. For example, 3840×2160 video may be downsampled by a scale factor of 4× to 960×540; by a scale factor of 3× to 1280×720; by a scale factor of 2× to 1920×1080; and by a scale factor of 1.5× to 2560×1440. In ITU-T H.266, reduced resolution for all scale factors from 1× to 2× are supported. It should be noted that scale factors 1.5× and 2× represent scaling between common resolutions, for example 1080p to 720p and 2160p to 1080p, respectively. In these cases, the scale factors represent a sample count reduction of 56% and 75%, respectively. ITU-T H.266 provides where two additional sets of filters are included in the Motion Compensation (MC) process: one that is optimized for 1.5× scaling and one that is optimized for 2× scaling. That is, the luma sample interpolation process provided in ITU-T H.266 is as follows:

Inputs to this Process are:
- a luma location in full-sample units ($xInt_L$, $yInt_L$),
- a luma location in fractional-sample units ($xFrac_L$, $yFrac_L$),
- a luma location in full-sample units ($xSbInt_L$, $ySbInt_L$) specifying the top-left sample of the bounding block for reference sample padding relative to the top-left luma sample of the reference picture,
- the luma reference sample array $refPicLX_L$,
- the half sample interpolation filter index hpelIfIdx,
- a variable sbWidth specifying the width of the current subblock,
- a variable sbHeight specifying the height of the current subblock,
- the decoder-side motion vector refinement flag dmvrFlag,
- a variable refWraparoundEnabledFlag indicating whether horizontal wrap-around motion compensation is enabled,
- a fixedpoint representation of the horizontal scaling factor scalingRatio[0],
- a fixedpoint representation of the vertical scaling factor scalingRatio[1],
- a luma location (xSb, ySb) specifying the top-left sample of the current subblock relative to the top-left luma sample of the current picture.

Output of this process is a predicted luma sample value $predSampleLX_L$

The Variables Shift1, Shift2 and Shift3 are Derived as Follows:

The variable shift1 is set equal to Min (4, BitDepth−8), the variable shift2 is set equal to 6 and the variable shift3 is set equal to Max (2, 14−BitDepth).

The variable picW is set equal to pps_pic_width_in_luma_samples of the reference picture refPicLX and the variable picH is set equal to pps_pic_height_in_luma_samples of the reference picture refPicLX.

The Horizontal and Vertical Half Sample Interpolation Filter Indices hpelHorIfIdx and hpelVerIfIdx are Derived as Follows:

hpelHorIfIdx=(scalingRatio[0]==16384)? hpelIfIdx: 0
hpelVerIfIdx=(scalingRatio[1]==16384)? hpelIfIdx: 0

The horizontal luma interpolation filter coefficients $f_{LH}[p]$ for each 1/16 fractional sample position p equal to $xFrac_L$ or $yFrac_L$ are derived as follows:

If MotionModelIdc[xSb][ySb] is greater than 0, and sbWidth and sbHeight are both equal to 4, and scalingRatio[0] is greater than 28 672, luma interpolation filter coefficients $f_{LH}[p]$ are specified in Table 9.

Otherwise, if MotionModelIdc[xSb][ySb] is greater than 0, and sbWidth and sbHeight are both equal to 4, and scalingRatio[0] is greater than 20 480, luma interpolation filter coefficients $f_{LH}[p]$ are specified in Table 8.

Otherwise, if MotionModelIdc[xSb][ySb] is greater than 0, and sbWidth and sbHeight are both equal to 4, the luma interpolation filter coefficients $f_{LH}[p]$ are specified in Table 7.

Otherwise, if scalingRatio[0] is greater than 28 672, luma interpolation filter coefficients $f_{LH}[p]$ are specified in Table 6.

Otherwise, if scalingRatio[0] is greater than 20 480, luma interpolation filter coefficients $f_{LH}[p]$ are specified in Table 5.

Otherwise, the luma interpolation filter coefficients $f_{LH}[p]$ are specified in Table 4 depending on hpelIfIdx set equal to hpelHorIfIdx.

The vertical luma interpolation filter coefficients $f_{LV}[p]$ for each 1/16 fractional sample position p equal to $yFrac_L$ are derived as follows:

If MotionModelIdc[xSb][ySb] is greater than 0, and sbWidth and sbHeight are both equal to 4, and scalingRatio[1] is greater than 28 672, the luma interpolation filter coefficients $f_{LV}[p]$ are specified in Table 9.

Otherwise, if MotionModelIdc[xSb][ySb] is greater than 0, and sbWidth and sbHeight are both equal to 4, and scalingRatio[1] is greater than 20 480, the luma interpolation filter coefficients $f_{LV}[p]$ are specified in Table 8.

Otherwise, if MotionModelIdc[xSb][ySb] is greater than 0, and sbWidth and sbHeight are both equal to 4, the luma interpolation filter coefficients $f_{LV}[p]$ are specified in Table 7.

Otherwise, if scalingRatio[1] is greater than 28 672, luma interpolation filter coefficients $f_{LV}[p]$ are specified in Table 6.

Otherwise, if scalingRatio[1] is greater than 20 480, luma interpolation filter coefficients $f_{LV}[p]$ are specified in Table 5.

Otherwise, the luma interpolation filter coefficients $f_{LV}[p]$ are specified in Table 4 depending on hpelIfIdx set equal to hpelVerIfIdx.

The luma locations in full-sample units ($xInt_i$, $yInt_i$) are derived as follows for i=0 ... 7:

$xInt_i = xInt_L + i - 3$ $yInt_i = yInt_L + i - 3$

When dmvrFlag is equal to 1, the following applies:

$xInt_i$=Clip3($xSbInt_L$−3, $xSbInt_L$+sbWidth−1+4, $xInt_i$)

$yInt_i$=Clip3($ySbInt_L$−3, $ySbInt_L$+sbHeight−1+4, $yInt_i$)

If sps_subpic_treated_as_pic_flag[CurrSubpicIdx] is equal to 1 and sps_num_subpics_minus1 for the reference picture refPicLX is greater than 0, the following applies:

$xInt_i$=Clip3(SubpicLeftBoundaryPos, SubpicRightBoundaryPos, refWraparoundEnabledFlag? ClipH((PpsRefWraparoundOffset)*MinCbSizeY, picW, $xInt_i$): $xInt_i$)

$yInt_i$=Clip3(SubpicTopBoundaryPos, SubpicBotBoundaryPos, $yInt_i$)

Otherwise (sps_subpic_treated_as_pic_flag[CurrSubpicIdx] is equal to 0 or sps_num_subpics_minus1 for the reference picture refPicLX is equal to 0), the following applies:

$xInt_i$=Clip3(0, picW−1, refWraparoundEnabledFlag? ClipH((PpsRefWraparoundOffset)*MinCbSizeY, picW, $xInt_i$): $xInt_i$)

$yInt_i$=Clip3(0, picH−1, $yInt_i$)

The predicted luma sample value predSampleLX$_L$ is derived as follows:

If both $xFrac_L$ and $yFrac_L$ are equal to 0, and both scalingRatio[0] and scalingRatio[1] are less than 20481, the value of predSampleLX$_L$ is derived as follows:

predSampleLX$_L$=refPicLX$_L$[xInt$_3$][yInt$_3$]<<shift3

Otherwise, if yFrac$_L$ is equal to 0 and scalingRatio[1] is less than 20481, the value of predSampleLX$_L$ is derived as follows:

$$predSampleLX_L = \left(\sum_{i=0}^{7} f_{LH}[xFrac_L][i] * refPicLX_L[xInt_i][yInt_3]\right) >> \text{shift1}$$

Otherwise, if xFrac$_L$ is equal to 0 and scalingRatio[0] is less than 20481, the value of predSampleLX$_L$ is derived as follows:

$$predSampleLX_L = \left(\sum_{i=0}^{7} f_{LH}[yFrac_L][i] * refPicLX_L[xInt_3][yInt_i]\right) >> \text{shift1}$$

Otherwise, the value of predSampleLX$_L$ is derived as follows:

The sample array temp[n] with n=0 ... 7, is derived as follows:

$$temp[n] = \left(\sum_{i=0}^{7} f_{LH}[xFrac_L][i] * refPicLX_L[xInt_i][yInt_n]\right) >> \text{shift1}$$

The predicted luma sample value predSampleLX$_L$ is derived as follows:

$$predSampleLX_L = \left(\sum_{i=0}^{7} f_{LV}[yFrac_L][i] * temp[i]\right) >> \text{shift2}$$

TABLE 4

| Fractional sample position | interpolation filter coefficients | | | | | | | |
|---|---|---|---|---|---|---|---|---|
| p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (hpelIfIdx == 0) | −1 | 4 | −11 | 40 | 40 | −11 | 4 | −1 |
| 8 (hpelIfIdx == 1) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

TABLE 5

| Fractional sample position | interpolation filter coefficients | | | | | | | |
|---|---|---|---|---|---|---|---|---|
| p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | −1 | −5 | 17 | 42 | 17 | −5 | −1 | 0 |
| 1 | 0 | −5 | 15 | 41 | 19 | −5 | −1 | 0 |
| 2 | 0 | −5 | 13 | 40 | 21 | −4 | −1 | 0 |
| 3 | 0 | −5 | 11 | 39 | 24 | −4 | −2 | 1 |
| 4 | 0 | −5 | 9 | 38 | 26 | −3 | −2 | 1 |
| 5 | 0 | −5 | 7 | 38 | 28 | −2 | −3 | 1 |
| 6 | 1 | −5 | 5 | 36 | 30 | −1 | −3 | 1 |
| 7 | 1 | −4 | 3 | 35 | 32 | 0 | −4 | 1 |
| 8 | 1 | −4 | 2 | 33 | 33 | 2 | −4 | 1 |
| 9 | 1 | −4 | 0 | 32 | 35 | 3 | −4 | 1 |
| 10 | 1 | −3 | −1 | 30 | 36 | 5 | −5 | 1 |
| 11 | 1 | −3 | −2 | 28 | 38 | 7 | −5 | 0 |
| 12 | 1 | −2 | −3 | 26 | 38 | 9 | −5 | 0 |
| 13 | 1 | −2 | −4 | 24 | 39 | 11 | −5 | 0 |
| 14 | 0 | −1 | −4 | 21 | 40 | 13 | −5 | 0 |
| 15 | 0 | −1 | −5 | 19 | 41 | 15 | −5 | 0 |

TABLE 6

| Fractional sample position | interpolation filter coefficients | | | | | | | |
|---|---|---|---|---|---|---|---|---|
| p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | −4 | 2 | 20 | 28 | 20 | 2 | −4 | 0 |
| 1 | −4 | 0 | 19 | 29 | 21 | 5 | −4 | −2 |
| 2 | −4 | −1 | 18 | 29 | 22 | 6 | −4 | −2 |
| 3 | −4 | −1 | 16 | 29 | 23 | 7 | −4 | −2 |
| 4 | −4 | −1 | 16 | 28 | 24 | 7 | −4 | −2 |
| 5 | −4 | −1 | 14 | 28 | 25 | 8 | −4 | −2 |
| 6 | −3 | −3 | 14 | 27 | 26 | 9 | −3 | −3 |
| 7 | −3 | −1 | 12 | 28 | 25 | 10 | −4 | −3 |
| 8 | −3 | −3 | 11 | 27 | 27 | 11 | −3 | −3 |
| 9 | −3 | −4 | 10 | 25 | 28 | 12 | −1 | −3 |
| 10 | −3 | −3 | 9 | 26 | 27 | 14 | −3 | −3 |
| 11 | −2 | −4 | 8 | 25 | 28 | 14 | −1 | −4 |
| 12 | −2 | −4 | 7 | 24 | 28 | 16 | −1 | −4 |
| 13 | −2 | −4 | 7 | 23 | 29 | 16 | −1 | −4 |
| 14 | −2 | −4 | 6 | 22 | 29 | 18 | −1 | −4 |
| 15 | −2 | −4 | 5 | 21 | 29 | 19 | 0 | −4 |

TABLE 7

| Fractional sample position | interpolation filter coefficients | | | | | | | |
|---|---|---|---|---|---|---|---|---|
| p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 1 | 0 | 1 | −3 | 63 | 4 | −2 | 1 | 0 |
| 2 | 0 | 1 | −5 | 62 | 8 | −3 | 1 | 0 |
| 3 | 0 | 2 | −8 | 60 | 13 | −4 | 1 | 0 |
| 4 | 0 | 3 | −10 | 58 | 17 | −5 | 1 | 0 |
| 5 | 0 | 3 | −11 | 52 | 26 | −8 | 2 | 0 |
| 6 | 0 | 2 | −9 | 47 | 31 | −10 | 3 | 0 |
| 7 | 0 | 3 | −11 | 45 | 34 | −10 | 3 | 0 |
| 8 | 0 | 3 | −11 | 40 | 40 | −11 | 3 | 0 |
| 9 | 0 | 3 | −10 | 34 | 45 | −11 | 3 | 0 |
| 10 | 0 | 3 | −10 | 31 | 47 | −9 | 2 | 0 |
| 11 | 0 | 2 | −8 | 26 | 52 | −11 | 3 | 0 |
| 12 | 0 | 1 | −5 | 17 | 58 | −10 | 3 | 0 |
| 13 | 0 | 1 | −4 | 13 | 60 | −8 | 2 | 0 |

TABLE 7-continued

| Fractional sample position | interpolation filter coefficients | | | | | | | |
|---|---|---|---|---|---|---|---|---|
| p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 14 | 0 | 1 | −3 | 8 | 62 | −5 | 1 | 0 |
| 15 | 0 | 1 | −2 | 4 | 63 | −3 | 1 | 0 |

TABLE 8

| Fractional sample position | interpolation filter coefficients | | | | | | | |
|---|---|---|---|---|---|---|---|---|
| p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | 0 | −6 | 17 | 42 | 17 | −5 | −1 | 0 |
| 1 | 0 | −5 | 15 | 41 | 19 | −5 | −1 | 0 |
| 2 | 0 | −5 | 13 | 40 | 21 | −4 | −1 | 0 |
| 3 | 0 | −5 | 11 | 39 | 24 | −4 | −1 | 0 |
| 4 | 0 | −5 | 9 | 38 | 26 | −3 | −1 | 0 |
| 5 | 0 | −5 | 7 | 38 | 28 | −2 | −2 | 0 |
| 6 | 0 | −4 | 5 | 36 | 30 | −1 | −2 | 0 |
| 7 | 0 | −3 | 3 | 35 | 32 | 0 | −3 | 0 |
| 8 | 0 | −3 | 2 | 33 | 33 | 2 | −3 | 0 |
| 9 | 0 | −3 | 0 | 32 | 35 | 3 | −3 | 0 |
| 10 | 0 | −2 | −1 | 30 | 36 | 5 | −4 | 0 |
| 11 | 0 | −2 | −2 | 28 | 38 | 7 | −5 | 0 |
| 12 | 0 | −1 | −3 | 26 | 38 | 9 | −5 | 0 |
| 13 | 0 | −1 | −4 | 24 | 39 | 11 | −5 | 0 |
| 14 | 0 | −1 | −4 | 21 | 40 | 13 | −5 | 0 |
| 15 | 0 | −1 | −5 | 19 | 41 | 15 | −5 | 0 |

TABLE 9

| Fractional sample position | interpolation filter coefficients | | | | | | | |
|---|---|---|---|---|---|---|---|---|
| p | $f_L[p][0]$ | $f_L[p][1]$ | $f_L[p][2]$ | $f_L[p][3]$ | $f_L[p][4]$ | $f_L[p][5]$ | $f_L[p][6]$ | $f_L[p][7]$ |
| 0 | 0 | −2 | 20 | 28 | 20 | 2 | −4 | 0 |
| 1 | 0 | −4 | 19 | 29 | 21 | 5 | −6 | 0 |
| 2 | 0 | −5 | 18 | 29 | 22 | 6 | −6 | 0 |
| 3 | 0 | −5 | 16 | 29 | 23 | 7 | −6 | 0 |
| 4 | 0 | −5 | 16 | 28 | 24 | 7 | −6 | 0 |
| 5 | 0 | −5 | 14 | 28 | 25 | 8 | −6 | 0 |
| 6 | 0 | −6 | 14 | 27 | 26 | 9 | −6 | 0 |
| 7 | 0 | −4 | 12 | 28 | 25 | 10 | −7 | 0 |
| 8 | 0 | −6 | 11 | 27 | 27 | 11 | −6 | 0 |
| 9 | 0 | −7 | 10 | 25 | 28 | 12 | −4 | 0 |
| 10 | 0 | −6 | 9 | 26 | 27 | 14 | −6 | 0 |
| 11 | 0 | −6 | 8 | 25 | 28 | 14 | −5 | 0 |
| 12 | 0 | −6 | 7 | 24 | 28 | 16 | −5 | 0 |
| 13 | 0 | −6 | 7 | 23 | 29 | 16 | −5 | 0 |
| 14 | 0 | −6 | 6 | 22 | 29 | 18 | −5 | 0 |
| 15 | 0 | −6 | 5 | 21 | 29 | 19 | −4 | 0 |

Further, the chroma sample interpolation process provided in ITU-T H.266 is as follows:

Inputs to this Process are:
- a chroma location in full-sample units (xInt$_C$, yInt$_C$),
- a chroma location in 1/32 fractional-sample units (xFrac$_C$, yFrac$_C$),
- a chroma location in full-sample units (xSbInt$_C$, ySbInt$_C$) specifying the top-left sample of the bounding block for reference sample padding relative to the top-left chroma sample of the reference picture,
- a variable sbWidth specifying the width of the current subblock,
- a variable sbHeight specifying the height of the current subblock,
- the chroma reference sample array refPicLX$_C$,
- the decoder-side motion vector refinement flag dmvrFlag,
- a variable refWraparoundEnabledFlag indicating whether horizontal wrap-around motion compensation is enabled, a fixedpoint representation of the horizontal scaling factor scalingRatio[0], a fixedpoint representation of the vertical scaling factor scalingRatio[1].

Output of this process is a predicted chroma sample value predSampleLX$_C$

The Variables Shift1, Shift2 and Shift3 are Derived as Follows:

The variable shift1 is set equal to Min (4, BitDepth−8), the variable shift2 is set equal to 6 and the variable shift3 is set equal to Max (2, 14-BitDepth).

The variable picW$_C$ is set equal to pps_pic_width_in_luma_samples/SubWidthC of the reference picture refPicLX and the variable picH$_C$ is set equal to pps_pic_height_in_luma_samples/SubHeightC of the reference picture refPicLX.

The horizontal chroma interpolation filter coefficients f$_{CH}$[p] for each 1/32 fractional sample position p equal to xFrac$_C$ are derived as follows:

If scalingRatio[0] is greater than 28 672, chroma interpolation filter coefficients f$_{CH}$[p] are specified in Table 12.

Otherwise, if scalingRatio[0] is greater than 20 480, chroma interpolation filter coefficients f$_{CH}$[p] are specified in Table 11.

Otherwise, chroma interpolation filter coefficients f$_{CH}$[p] are specified in Table 10.

The vertical chroma interpolation filter coefficients f$_{CV}$[p] for each 1/32 fractional sample position p equal to yFrac$_C$ are derived as follows:

If scalingRatio[1] is greater than 28 672, chroma interpolation filter coefficients f$_{CV}$[p] are specified in Table 12.

Otherwise, if scalingRatio[1] is greater than 20 480, chroma interpolation filter coefficients f$_{CV}$[p] are specified in Table 11.

Otherwise, chroma interpolation filter coefficients f$_{CV}$[p] are specified in Table 10.

The variable xOffset is set equal to PpsRefWraparoundOffset*MinCbSizeY/SubWidthC.

The chroma locations in full-sample units (xInt$_i$, yInt$_i$) are derived as follows for i=0 . . . 3:

xInt$_i$=xInt$_C$+i−1 yInt$_i$=yInt$_C$+i−1

When dmvrFlag is equal to 1, the following applies:

xInt$_i$=Clip3(xSbInt$_C$−1, xSbInt$_C$+sbWidth−1+2, xInt$_i$)

yInt$_i$=Clip3(ySbInt$_C$−1, ySbInt$_C$+sbHeight−1+2, yInt$_i$)

If sps_subpic_treated_as_pic_flag[CurrSubpicIdx] is equal to 1 and sps_num_subpics_minus1 for the reference picture refPicLX is greater than 0, the following applies:

xInt$_i$=Clip3(SubpicLeftBoundaryPos/SubWidthC, SubpicRightBoundaryPos/SubWidthC, refWraparoundEnabledFlag? ClipH(xOffset, picW$_C$, xInt$_i$): xInt$_i$)

yInt$_i$=Clip3(SubpicTopBoundaryPos/SubHeightC, SubpicBotBoundaryPos/SubHeightC, yInt$_i$)

Otherwise (sps_subpic_treated_as_pic_flag[CurrSubpicIdx] is equal to 0 or sps_num_subpics_minus1 for the reference picture refPicLX is equal to 0), the following applies:

xInt$_i$=Clip3(0, picW$_C$−1, refWraparoundEnabledFlag? ClipH(xOffset, picW$_C$, xInt$_i$): xInt$_i$)

yInt$_i$=Clip3(0, picH$_C$−1, yInt$_i$)

The Predicted Chroma Sample Value predSampleLX$_C$ is Derived as Follows:

If both xFrac$_C$ and yFrac$_C$ are equal to 0, and both scalingRatio[0] and scalingRatio[1] are less than 20481, the value of predSampleLX$_C$ is derived as follows:

predSampleLX$_C$=refPicLX$_C$ [xInt$_1$][yInt$_1$)]<<shift3

Otherwise, if yFrac$_C$ is equal to 0 and scalingRatio[1] is less than 20481, the value of predSampleLX$_C$ is derived as follows:

$$predSampleLX_C = \left(\sum_{i=0}^{3} f_{CH}[xFrac_C][i] * refPicLX_C[xInt_i][yInt_1]\right) >> shift1$$

Otherwise, if xFrac$_C$ is equal to 0 and scalingRatio[0] is less than 20481, the value of predSampleLX$_C$ is derived as follows:

$$predSampleLX_C = \left(\sum_{i=0}^{3} f_{CV}[yFrac_C][i] * refPicLX_C[xInt_1][yInt_i]\right) >> shift1$$

Otherwise, the value of predSampleLX$_C$ is derived as follows:

The sample array temp[n] with n=0 . . . 3, is derived as follows:

$$temp[n] = \left(\sum_{i=0}^{3} f_{CH}[xFrac_C][i] * refPicLX_C[xInt_i][yInt_n]\right) >> shift1$$

The predicted chroma sample value predSampleLX$_C$ is derived as follows:

$$predSampleLX_C = (f_{CV}[yFrac_C][0] * temp[0] + f_{CV}[yFrac_C][1] * temp[1] + f_{CV}[yFrac_C][2] * temp[2] + f_{CV}[yFrac_C][3] * temp[3]) >> shift2$$

TABLE 10

| Fractional sample position p | interpolation filter coefficients | | | |
| --- | --- | --- | --- | --- |
| | f$_C$[p][0] | f$_C$[p][1] | f$_C$[p][2] | f$_C$[p][3] |
| 1 | −1 | 63 | 2 | 0 |
| 2 | −2 | 62 | 4 | 0 |
| 3 | −2 | 60 | 7 | −1 |
| 4 | −2 | 58 | 10 | −2 |
| 5 | −3 | 57 | 12 | −2 |
| 6 | −4 | 56 | 14 | −2 |
| 7 | −4 | 55 | 15 | −2 |
| 8 | −4 | 54 | 16 | −2 |
| 9 | −5 | 53 | 18 | −2 |
| 10 | −6 | 52 | 20 | −2 |
| 11 | −6 | 49 | 24 | −3 |
| 12 | −6 | 46 | 28 | −4 |
| 13 | −5 | 44 | 29 | −4 |
| 14 | −4 | 42 | 30 | −4 |
| 15 | −4 | 39 | 33 | −4 |
| 16 | −4 | 36 | 36 | −4 |
| 17 | −4 | 33 | 39 | −4 |
| 18 | −4 | 30 | 42 | −4 |
| 19 | −4 | 29 | 44 | −5 |
| 20 | −4 | 28 | 46 | −6 |

TABLE 10-continued

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 21 | −3 | 24 | 49 | −6 |
| 22 | −2 | 20 | 52 | −6 |
| 23 | −2 | 18 | 53 | −5 |
| 24 | −2 | 16 | 54 | −4 |
| 25 | −2 | 15 | 55 | −4 |
| 26 | −2 | 14 | 56 | −4 |
| 27 | −2 | 12 | 57 | −3 |
| 28 | −2 | 10 | 58 | −2 |
| 29 | −1 | 7 | 60 | −2 |
| 30 | 0 | 4 | 62 | −2 |
| 31 | 0 | 2 | 63 | −1 |

TABLE 11

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 0 | 12 | 40 | 12 | 0 |
| 1 | 11 | 40 | 13 | 0 |
| 2 | 10 | 40 | 15 | −1 |
| 3 | 9 | 40 | 16 | −1 |
| 4 | 8 | 40 | 17 | −1 |
| 5 | 8 | 39 | 18 | −1 |
| 6 | 7 | 39 | 19 | −1 |
| 7 | 6 | 38 | 21 | −1 |
| 8 | 5 | 38 | 22 | −1 |
| 9 | 4 | 38 | 23 | −1 |
| 10 | 4 | 37 | 24 | −1 |
| 11 | 3 | 36 | 25 | 0 |
| 12 | 3 | 35 | 26 | 0 |
| 13 | 2 | 34 | 28 | 0 |
| 14 | 2 | 33 | 29 | 0 |
| 15 | 1 | 33 | 30 | 0 |
| 16 | 1 | 31 | 31 | 1 |
| 17 | 0 | 30 | 33 | 1 |
| 18 | 0 | 29 | 33 | 2 |
| 19 | 0 | 28 | 34 | 2 |
| 20 | 0 | 26 | 35 | 3 |
| 21 | 0 | 25 | 36 | 3 |
| 22 | −1 | 24 | 37 | 4 |
| 23 | −1 | 23 | 38 | 4 |
| 24 | −1 | 22 | 38 | 5 |
| 25 | −1 | 21 | 38 | 6 |
| 26 | −1 | 19 | 39 | 7 |
| 27 | −1 | 18 | 39 | 8 |
| 28 | −1 | 17 | 40 | 8 |
| 29 | −1 | 16 | 40 | 9 |
| 30 | −1 | 15 | 40 | 10 |
| 31 | 0 | 13 | 40 | 11 |

TABLE 12

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 0 | 17 | 30 | 17 | 0 |
| 1 | 17 | 30 | 18 | −1 |
| 2 | 16 | 30 | 18 | 0 |
| 3 | 16 | 30 | 18 | 0 |
| 4 | 15 | 30 | 18 | 1 |
| 5 | 14 | 30 | 18 | 2 |
| 6 | 13 | 29 | 19 | 3 |
| 7 | 13 | 29 | 19 | 3 |
| 8 | 12 | 29 | 20 | 3 |
| 9 | 11 | 28 | 21 | 4 |
| 10 | 10 | 28 | 22 | 4 |

TABLE 12-continued

| Fractional sample position p | interpolation filter coefficients | | | |
|---|---|---|---|---|
| | $f_C[p][0]$ | $f_C[p][1]$ | $f_C[p][2]$ | $f_C[p][3]$ |
| 11 | 10 | 27 | 22 | 5 |
| 12 | 9 | 27 | 23 | 5 |
| 13 | 9 | 26 | 24 | 5 |
| 14 | 8 | 26 | 24 | 6 |
| 15 | 7 | 26 | 25 | 6 |
| 16 | 7 | 25 | 25 | 7 |
| 17 | 6 | 25 | 26 | 7 |
| 18 | 6 | 24 | 26 | 8 |
| 19 | 5 | 24 | 26 | 9 |
| 20 | 5 | 23 | 27 | 9 |
| 21 | 5 | 22 | 27 | 10 |
| 22 | 4 | 22 | 28 | 10 |
| 23 | 4 | 21 | 28 | 11 |
| 24 | 3 | 20 | 29 | 12 |
| 25 | 3 | 19 | 29 | 13 |
| 26 | 3 | 19 | 29 | 13 |
| 27 | 2 | 18 | 30 | 14 |
| 28 | 1 | 18 | 30 | 15 |
| 29 | 0 | 18 | 30 | 16 |
| 30 | 0 | 18 | 30 | 16 |
| 31 | −1 | 18 | 30 | 17 |

As further provided above, ECM describes the coding features that are under coordinated test model study by as potentially enhancing video coding technology beyond the capabilities of ITU-T H.266. In ECM, the 8-tap interpolation filter used in ITU-T H.266 is replaced with a 12-tap filter cos-windowed sinc filter (i.e., the sinc function of which the frequency response is cut off at Nyquist frequency and cropped by a cosine window function), when the scale factor is above 1.25× (and below 1.67×). Table 13 provides the filter coefficients of all 15 phases.

TABLE 13

| | | | | | | | | | | | | |
|---|---|---|---|---|---|---|---|---|---|---|---|---|
| 1/16 | −1 | 2 | −3 | 6 | −14 | 254 | 16 | −7 | 4 | −2 | 1 | 0 |
| 2/16 | −1 | 3 | −7 | 12 | −26 | 249 | 35 | −15 | 8 | −4 | 2 | 0 |
| 3/16 | −2 | 5 | −9 | 17 | −36 | 241 | 54 | −22 | 12 | −6 | 3 | −1 |
| 4/16 | −2 | 5 | −11 | 21 | −43 | 230 | 75 | −29 | 15 | −8 | 4 | −1 |
| 5/16 | −2 | 6 | −13 | 24 | −48 | 216 | 97 | −36 | 19 | −10 | 4 | −1 |
| 6/16 | −2 | 7 | −14 | 25 | −51 | 200 | 119 | −42 | 22 | −12 | 5 | −1 |
| 7/16 | −2 | 7 | −14 | 26 | −51 | 181 | 140 | −46 | 24 | −13 | 6 | −2 |
| 8/16 | −2 | 6 | −13 | 25 | −50 | 162 | 162 | −50 | 25 | −13 | 6 | −2 |
| 9/16 | −2 | 6 | −13 | 24 | −46 | 140 | 181 | −51 | 26 | −14 | 7 | −2 |
| 10/16 | −1 | 5 | −12 | 22 | −42 | 119 | 200 | −51 | 25 | −14 | 7 | −2 |
| 11/16 | −1 | 4 | −10 | 19 | −36 | 97 | 216 | −48 | 24 | −13 | 6 | −2 |
| 12/16 | −1 | 4 | −8 | 15 | −29 | 75 | 230 | −43 | 21 | −11 | 5 | −2 |
| 13/16 | −1 | 3 | −6 | 12 | −22 | 54 | 241 | −36 | 17 | −9 | 5 | −2 |
| 14/16 | 0 | 2 | −4 | 8 | −15 | 35 | 249 | −26 | 12 | −7 | 3 | −1 |
| 15/16 | 0 | 1 | −2 | 4 | −7 | 16 | 254 | −14 | 6 | −3 | 2 | −1 |

Further, in ECM, when the scale factor is between 1.05× and 1.25×, inclusive, the 8-tap interpolation filter used in ITU-T H.266, is replaced with a 10-tap cos-windowed sinc filter for ratio 1.5×. Further, in ECM, for chroma interpolation additional longer 6-tap filters are used. The coefficients of filters are tabulated in Table 14.

TABLE 14

| Fractional position | Coefficients (6 taps) |
|---|---|
| 1/32 | {0, 0, 256, 0, 0, 0}, |
| 2/32 | {1, −6, 256, 7, −2, 0}, |
| 3/32 | {2, −11, 253, 15, −4, 1}, |
| 4/32 | {3, −16, 251, 23, −6, 1}, |
| 5/32 | {4, −21, 248, 33, −10, 2}, |
| 6/32 | {5, −25, 244, 42, −12, 2}, |

TABLE 14-continued

| Fractional position | Coefficients (6 taps) |
|---|---|
| 7/32 | {7, −30, 239, 53, −17, 4}, |
| 8/32 | {7, −32, 234, 62, −19, 4}, |
| 6/32 | {8, −35, 227, 73, −22, 5}, |
| 7/32 | {9, −38, 220, 84, −26, 7}, |
| 8/32 | {10, −40, 213, 95, −29, 7}, |
| 9/32 | {10, −41, 204, 106, −31, 8}, |
| 10/32 | {10, −42, 196, 117, −34, 9}, |
| 11/32 | {10, −41, 187, 127, −35, 8}, |
| 12/32 | {11, −42, 177, 138, −38, 10}, |
| 13/32 | {10, −41, 168, 148, −39, 10}, |
| 14/32 | {10, −40, 158, 158, −40, 10}, |
| 15/32 | {10, −39, 148, 168, −41, 10}, |
| 16/32 | {10, −38, 138, 177, −42, 11}, |
| 17/32 | {8, −35, 127, 187, −41, 10}, |
| 18/32 | {9, −34, 117, 196, −42, 10}, |
| 19/32 | {8, −31, 106, 204, −41, 10}, |
| 20/32 | {7, −29, 95, 213, −40, 10}, |
| 21/32 | {7, −26, 84, 220, −38, 9}, |
| 22/32 | {5, −22, 73, 227, −35, 8}, |
| 23/32 | {4, −19, 62, 234, −32, 7}, |
| 24/32 | {4, −17, 53, 239, −30, 7}, |
| 25/32 | {2, −12, 42, 244, −25, 5}, |
| 26/32 | {2, −10, 33, 248, −21, 4}, |
| 27/32 | {1, −6, 23, 251, −16, 3}, |
| 28/32 | {1, −4, 15, 253, −11, 2}, |
| 31/32 | {0, −2, 7, 256, −6, 1}, |

The interpolation filters provided in ITU-H.266 and ECM may be less than ideal. In ITU-H.266 and ECM, for luma interpolation, the same filter is used for both uni-prediction and bi-prediction and other filters are used for chroma interpolation, the affine motion model, and RPR. In ITU-H.266 and ECM, when a block is predicted using bi-prediction, two different reference blocks will be blended together to form the final prediction of the block. One or both of these reference blocks might be located at a non-integer position, and thereby be the result of a filtering operation. It is asserted that the blending and the filtering can result in a predicted block is more smooth than would be ideal and that a slight level of sharpening would be beneficial to improve the prediction. According to the techniques herein, a different MC-filter may be used for bi-predicted blocks compared to uni-predicted blocks.

FIG. 1 is a block diagram illustrating an example of a system that may be configured to code (i.e., encode and/or decode) video data according to one or more techniques of this disclosure. System 100 represents an example of a system that may encapsulate video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include, for example, set top boxes, digital video recorders, televisions, desktop, laptop or tablet computers, gaming consoles, medical imagining devices, and mobile devices, including, for example, smartphones, cellular telephones, personal gaming devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Figure 5:
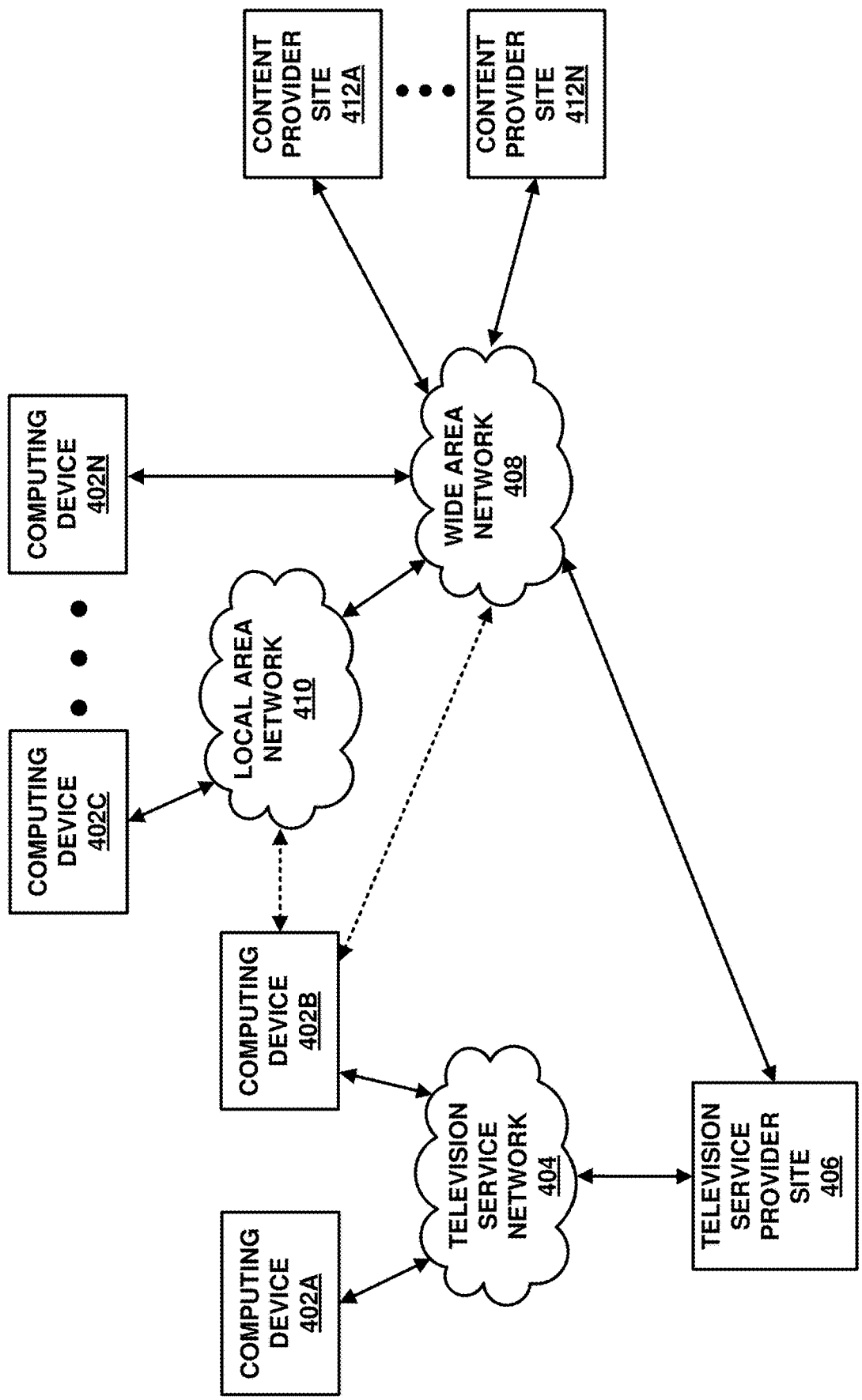
FIG. 5 is a conceptual drawing illustrating an example of components that may be included in an implementation of a system that may be configured to encode and decode video data according to one or more techniques of this disclosure.

FIG. 5 is a conceptual drawing illustrating an example of components that may be included in an implementation of system 100. In the example implementation illustrated in FIG. 5, system 100 includes one or more computing devices 402A-402N, television service network 404, television service provider site 406, wide area network 408, local area network 410, and one or more content provider sites 412A-412N. The implementation illustrated in FIG. 5 represents an example of a system that may be configured to allow digital media content, such as, for example, a movie, a live sporting event, etc., and data and applications and media presentations associated therewith to be distributed to and accessed by a plurality of computing devices, such as computing devices 402A-402N. In the example illustrated in FIG. 5, computing devices 402A-402N may include any device configured to receive data from one or more of television service network 404, wide area network 408, and/or local area network 410. For example, computing devices 402A-402N may be equipped for wired and/or wireless communications and may be configured to receive services through one or more data channels and may include televisions, including so-called smart televisions, set top boxes, and digital video recorders. Further, computing devices 402A-402N may include desktop, laptop, or tablet computers, gaming consoles, mobile devices, including, for example, "smart" phones, cellular telephones, and personal gaming devices.

Television service network 404 is an example of a network configured to enable digital media content, which may include television services, to be distributed. For example, television service network 404 may include public over-the-air television networks, public or subscription-based satellite television service provider networks, and public or subscription-based cable television provider networks and/or over the top or Internet service providers. It should be noted that although in some examples television service network 404 may primarily be used to enable television services to be provided, television service network 404 may also enable other types of data and services to be provided according to any combination of the telecommunication protocols described herein. Further, it should be noted that in some examples, television service network 404 may enable two-way communications between television service provider site 406 and one or more of computing devices 402A-402N. Television service network 404 may comprise any combination of wireless and/or wired communication media. Television service network 404 may include coaxial cables, fiber optic cables, twisted pair cables, wireless transmitters and receivers, routers, switches, repeaters, base stations, or any other equipment that may be useful to facilitate communications between various devices and sites. Television service network 404 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 5, television service provider site 406 may be configured to distribute television service via television service network 404. For example, television service provider site 406 may include one or more broadcast stations, a cable television provider, or a satellite television provider, or an Internet-based television provider. For example, television service provider site 406 may be configured to receive a transmission including television programming through a satellite uplink/downlink. Further, as illustrated in FIG. 5, television service provider site 406 may be in communication with wide area network 408 and may be configured to receive data from content provider sites 412A-412N. It should be noted that in some examples, television service provider site 406 may include a television studio and content may originate therefrom.

Wide area network 408 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 408 may comprise any combination of wireless and/or wired communication media. Wide area network 408 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 408 may include the Internet. Local area network 410 may include a packet based network and operate according to a combination of one or more telecommunication protocols. Local area network 410 may be distinguished from wide area network 408 based on levels of access and/or physical infrastructure. For example, local area network 410 may include a secure home network.

Referring again to FIG. 5, content provider sites 412A-412N represent examples of sites that may provide multimedia content to television service provider site 406 and/or computing devices 402A-402N. For example, a content provider site may include a studio having one or more studio content servers configured to provide multimedia files and/or streams to television service provider site 406. In one example, content provider sites 412A-412N may be configured to provide multimedia content using the IP suite. For example, a content provider site may be configured to provide multimedia content to a receiver device according to Real Time Streaming Protocol (RTSP), HTTP, or the like. Further, content provider sites 412A-412N may be configured to provide data, including hypertext based content, and the like, to one or more of receiver devices computing devices 402A-402N and/or television service provider site 406 through wide area network 408. Content provider sites 412A-412N may include one or more web servers. Data provided by data provider site 412A-412N may be defined according to data formats.

Figure 6:
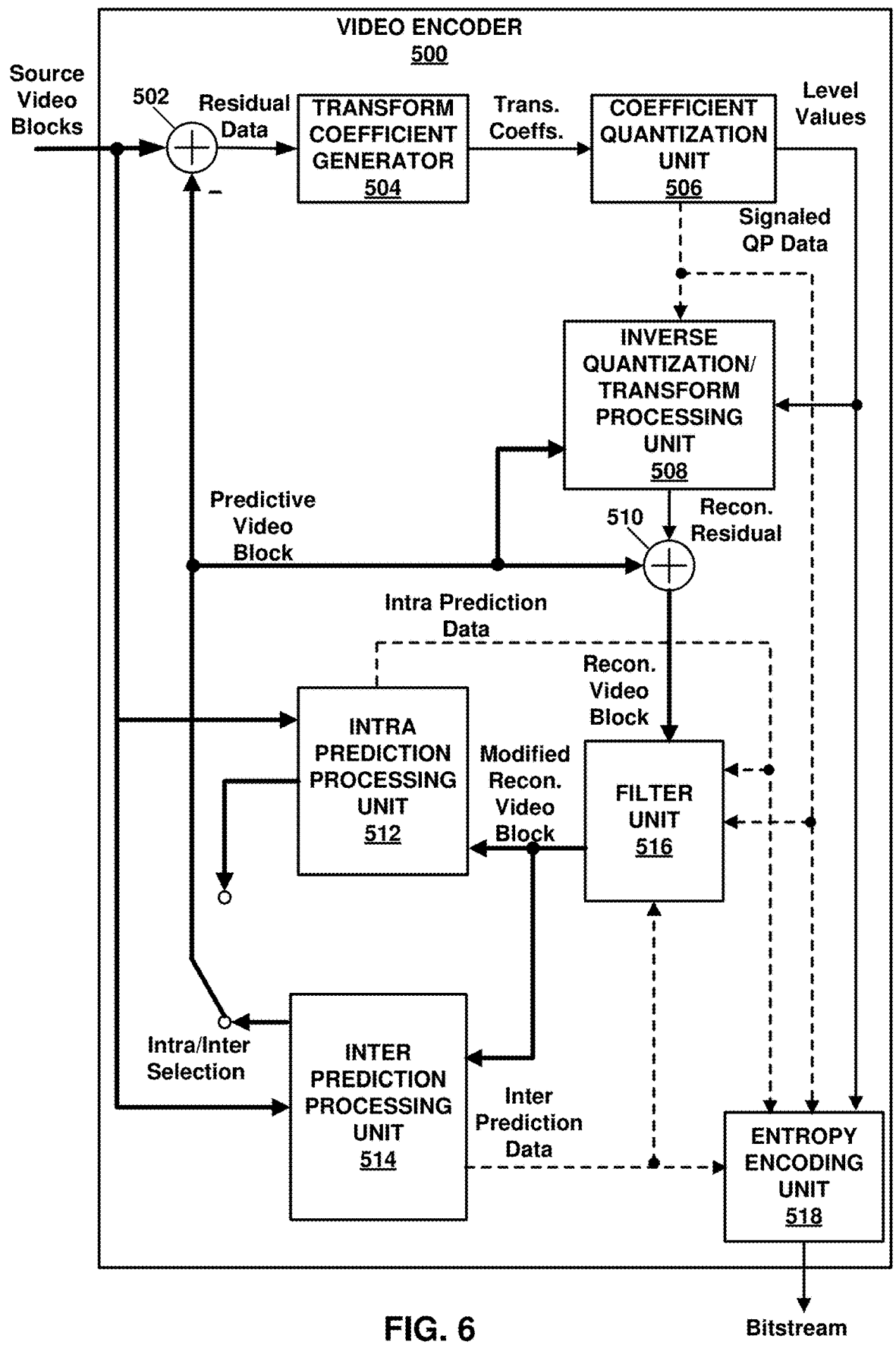
FIG. 6 is a block diagram illustrating an example of a video encoder that may be configured to encode video data according to one or more techniques of this disclosure.

Referring again to FIG. 1, source device 102 includes video source 104, video encoder 106, data encapsulator 107, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible to a viewer) or lossless. FIG. 6 is a block diagram illustrating an example of video encoder 500 that may implement the techniques for encoding video data described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations.

Video encoder 500 may perform intra prediction coding and inter prediction coding of picture areas, and, as such, may be referred to as a hybrid video encoder. In the example illustrated in FIG. 6, video encoder 500 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 500 may be configured to perform additional sub-divisions of source video blocks. It should be noted that the techniques described herein are generally applicable to video coding, regardless of how source video data is partitioned prior to and/or during encoding. In the example illustrated in FIG. 6, video encoder 500 includes summer 502, transform coefficient generator 504, coefficient quantization unit 506, inverse quantization and transform coefficient processing unit 508, summer 510, intra prediction processing unit 512, inter prediction processing unit 514, filter unit 516, and entropy encoding unit 518. As illustrated in FIG. 6, video encoder 500 receives source video blocks and outputs a bitstream.

In the example illustrated in FIG. 6, video encoder 500 may generate residual data by subtracting a predictive video block from a source video block. The selection of a predictive video block is described in detail below. Summer 502 represents a component configured to perform this subtraction operation. In one example, the subtraction of video blocks occurs in the pixel domain. Transform coefficient generator 504 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 504 may be configured to perform any and all combinations of the transforms included in the family of discrete trigonometric transforms, including approximations thereof. Transform coefficient generator 504 may output transform coefficients to coefficient quantization unit 506. Coefficient quantization unit 506 may be configured to perform quantization of the transform coefficients. The quantization process may reduce the bit depth associated with some or all of the coefficients. The degree of quantization may alter the rate-distortion (i.e., bit-rate vs. quality of video) of encoded video data. The degree of quantization may be modified by adjusting a quantization parameter (QP). A quantization parameter may be determined based on slice level values and/or CU level values (e.g., CU delta QP values). QP data may include any data used to determine a QP for quantizing a particular set of transform coefficients. As illustrated in FIG. 6, quantized transform coefficients (which may be referred to as level values) are output to inverse quantization and transform coefficient processing unit 508. Inverse quantization and transform coefficient processing unit 508 may be configured to apply an inverse quantization and an inverse transformation to generate reconstructed residual data. As illustrated in FIG. 6, at summer 510, reconstructed residual data may be added to a predictive video block. In this manner, an encoded video block may be reconstructed and the resulting reconstructed video block may be used to evaluate the encoding quality for a given prediction, transformation, and/or quantization. Video encoder 500 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

Referring again to FIG. 6, intra prediction processing unit 512 may be configured to select an intra prediction mode for a video block to be coded. Intra prediction processing unit 512 may be configured to evaluate a frame and determine an intra prediction mode to use to encode a current block. As described above, possible intra prediction modes may include planar prediction modes, DC prediction modes, and angular prediction modes. Further, it should be noted that in some examples, a prediction mode for a chroma component may be inferred from a prediction mode for a luma prediction mode. Intra prediction processing unit 512 may select an intra prediction mode after performing one or more coding passes. Further, in one example, intra prediction processing unit 512 may select a prediction mode based on a rate-distortion analysis. As illustrated in FIG. 6, intra prediction processing unit 512 outputs intra prediction data (e.g., syntax elements) to entropy encoding unit 518 and transform coefficient generator 504. As described above, a transform performed on residual data may be mode dependent (e.g., a secondary transform matrix may be determined based on a prediction mode).

Referring again to FIG. 6, inter prediction processing unit 514 may be configured to perform inter prediction coding for a current video block. Inter prediction processing unit 514 may be configured to receive source video blocks and calculate a motion vector for PUs of a video block. A motion vector may indicate the displacement of a prediction unit of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 514 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 514 may be configured to perform motion vector prediction, as described above. Inter prediction processing unit 514 may be configured to generate a predictive block using the motion prediction data. For example, inter prediction processing unit 514 may locate a predictive video block within a frame buffer (not shown in FIG. 7). It should be noted that inter prediction processing unit 514 may further be configured to apply one or more interpolation filters to a reconstructed residual block to calculate sub-integer pixel values for use in motion estimation. Inter prediction processing unit 514 may output motion prediction data for a calculated motion vector to entropy encoding unit 518.

Referring again to FIG. 6, filter unit 516 receives reconstructed video blocks and coding parameters and outputs modified reconstructed video data. Filter unit 516 may be configured to perform deblocking and/or Sample Adaptive Offset (SAO) filtering. SAO filtering is a non-linear amplitude mapping that may be used to improve reconstruction by adding an offset to reconstructed video data. It should be noted that as illustrated in FIG. 6, intra prediction processing unit 512 and inter prediction processing unit 514 may receive modified reconstructed video block via filter unit 516. Entropy encoding unit 518 receives quantized transform coefficients and predictive syntax data (i.e., intra prediction data and motion prediction data). It should be noted that in some examples, coefficient quantization unit 506 may perform a scan of a matrix including quantized transform coefficients before the coefficients are output to entropy encoding unit 518. In other examples, entropy encoding unit 518 may perform a scan. Entropy encoding unit 518 may be configured to perform entropy encoding according to one or more of the techniques described herein. In this manner, video encoder 500 represents an example of a device configured to generate encoded video data according to one or more techniques of this disclosure.

Referring again to FIG. 1, data encapsulator 107 may receive encoded video data and generate a compliant bitstream, e.g., a sequence of NAL units according to a defined data structure. A device receiving a compliant bitstream can reproduce video data therefrom. Further, as described above, sub-bitstream extraction may refer to a process where a device receiving a compliant bitstream forms a new compliant bitstream by discarding and/or modifying data in the received bitstream. It should be noted that the term conforming bitstream may be used in place of the term compliant bitstream. In one example, data encapsulator 107 may be configured to generate syntax according to one or more techniques described herein. It should be noted that data encapsulator 107 need not necessary be located in the same physical device as video encoder 106. For example, functions described as being performed by video encoder 106 and data encapsulator 107 may be distributed among devices illustrated in FIG. 6.

As described above, the interpolation filters provided in ITU-H.266 and ECM may be less than ideal. According to the techniques herein, in one example, an additional MC filter may be used for bi-predicted blocks, while the existing MC filter provided in ITU-H.266 and ECM, described above, may be used for uni-predicted blocks. In one example, the filters described above may be used for chroma interpolation, the affine motion model, and RPR. Table 15 provides an example of the filter coefficients of all 15 phases that may be used for bi-predicted blocks according to the techniques herein.

TABLE 15

| | | | | | | | | | | | |
|---|---|---|---|---|---|---|---|---|---|---|---|
| 1/16 | −1 | 2 | −4 | 7 | −15 | 255 | 16 | −7 | 4 | −2 | 1 | 0 |
| 2/16 | −2 | 4 | −8 | 14 | −28 | 252 | 33 | −14 | 7 | −4 | 2 | 0 |
| 3/16 | −3 | 6 | −11 | 20 | −39 | 244 | 52 | −20 | 10 | −5 | 2 | 0 |
| 4/16 | −3 | 8 | −14 | 24 | −47 | 233 | 71 | −26 | 13 | −6 | 3 | 0 |
| 5/16 | −3 | 9 | −16 | 27 | −53 | 221 | 94 | −33 | 16 | −8 | 3 | −1 |
| 6/16 | −3 | 8 | −16 | 28 | −54 | 204 | 116 | −39 | 19 | −10 | 4 | −1 |
| 7/16 | −2 | 7 | −15 | 27 | −53 | 183 | 139 | −45 | 22 | −11 | 5 | −2 |
| 8/16 | −2 | 6 | −13 | 25 | −50 | 162 | 162 | −50 | 25 | −13 | 6 | −2 |
| 9/16 | −1 | 5 | −11 | 22 | −45 | 139 | 183 | −53 | 27 | −15 | 7 | −2 |
| 10/16 | −1 | 4 | −10 | 19 | −39 | 116 | 204 | −54 | 28 | −16 | 8 | −3 |
| 11/16 | −1 | 3 | −8 | 16 | −33 | 94 | 221 | −53 | 27 | −16 | 9 | −3 |
| 12/16 | 0 | 3 | −6 | 13 | −26 | 71 | 233 | −47 | 24 | −14 | 8 | −3 |
| 13/16 | 0 | 2 | −5 | 10 | −20 | 52 | 244 | −39 | 20 | −11 | 6 | −2 |
| 14/16 | 0 | 2 | −4 | 7 | −14 | 33 | 252 | −28 | 14 | −8 | 4 | −2 |
| 15/16 | 0 | 1 | −2 | 4 | −7 | 16 | 255 | −15 | 7 | −4 | 2 | −1 |

It should be noted that like the ECM MC filters, the filter provided in Table 15 is based on a cos-windowed sine function. However, a more generalized form has been used, and unlike the ECM MC filter, a and b have been selected to be slightly lower than 1 (instead of equal to 1). The formula is shown in Equation (1), where A is a scaling factor to provide the desired number of filter taps. In the example corresponding to Table 15 a and b are set according to Table 16.

TABLE 16

| phase | a | b |
|---|---|---|
| 1/16 | 0.9880516910631005 | 0.9984775906502258 |
| 2/16 | 0.9713125755754359 | 0.994142135623731 |
| 3/16 | 0.9534241639740473 | 0.9876536686473019 |
| 4/16 | 0.9362719686340369 | 0.98 |
| 5/16 | 0.9213316038292295 | 0.9723463313526982 |
| 6/16 | 0.9097805968462166 | 0.965857864376269 |

TABLE 16-continued

| phase | a | b |
|---|---|---|
| 7/16 | 0.9024906814964433 | 0.9615224093497742 |
| 8/16 | 0.9 | 0.96 |
| 9/16 | 0.9024906814964433 | 0.9615224093497742 |
| 10/16 | 0.9097805968462166 | 0.965857864376269 |
| 11/16 | 0.9213316038292295 | 0.9723463313526982 |
| 12/16 | 0.9362719686340369 | 0.98 |
| 13/16 | 0.9534241639740473 | 0.9876536686473019 |
| 14/16 | 0.9713125755754359 | 0.994142135623731 |
| 15/16 | 0.9880516910631005 | 0.9984775906502258 |

$$f(x) = \cos^a(Ax)\text{sinc}\left(\frac{x}{b}\right) \quad (1)$$

The normalized sinc function shown in Equation (2) is used.

$$\text{sinc}(x) = \begin{cases} \frac{\sin(\pi x)}{\pi}, & x \neq 0 \\ 1, & x = 0 \end{cases} \quad (2)$$

Figure 7:
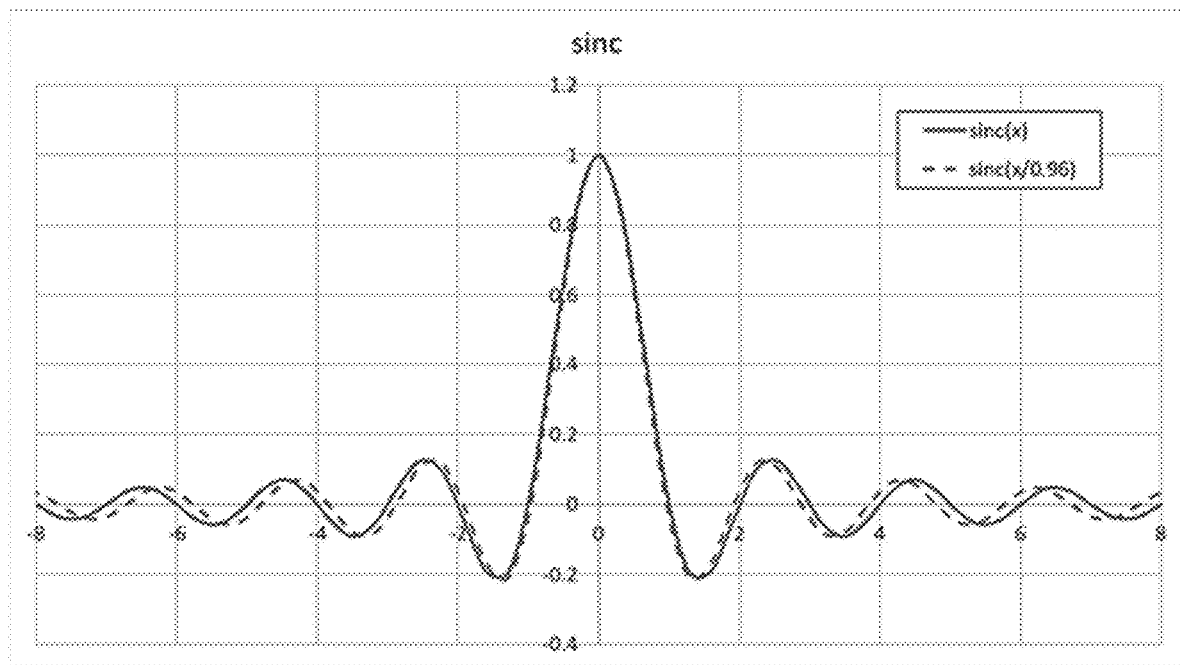
FIG. 7 is a chart illustrating an example of a filter function according to one or more techniques of this disclosure.
Figure 8:
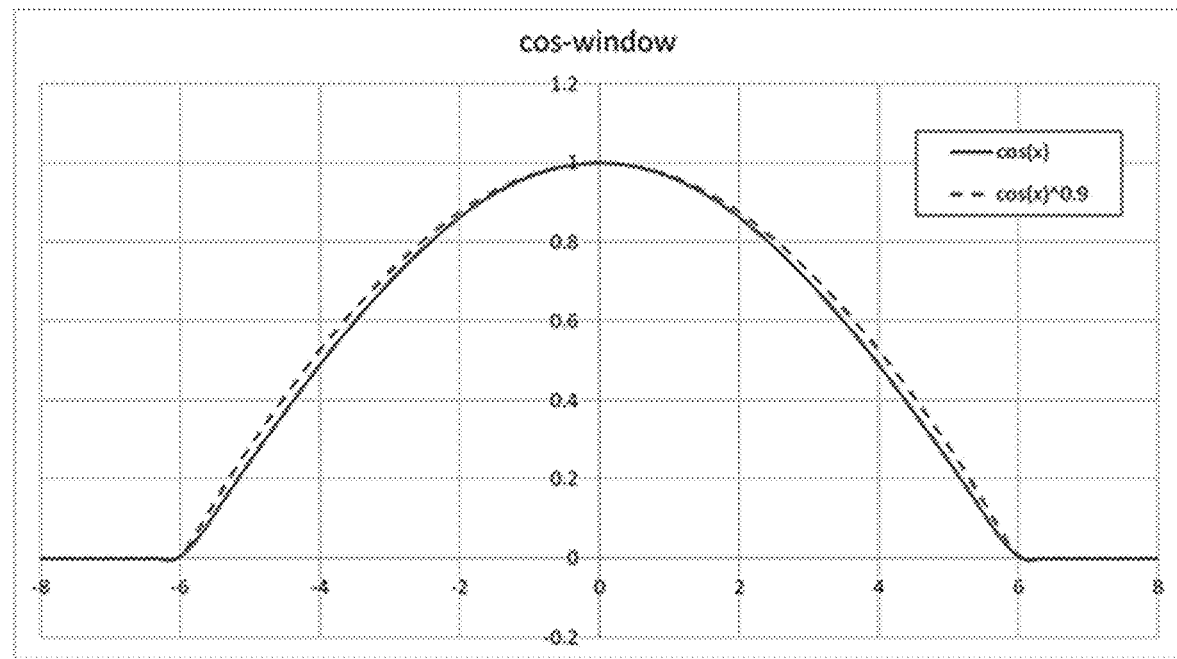
FIG. 8 is a chart illustrating an example of a filter function according to one or more techniques of this disclosure.
Figure 9:
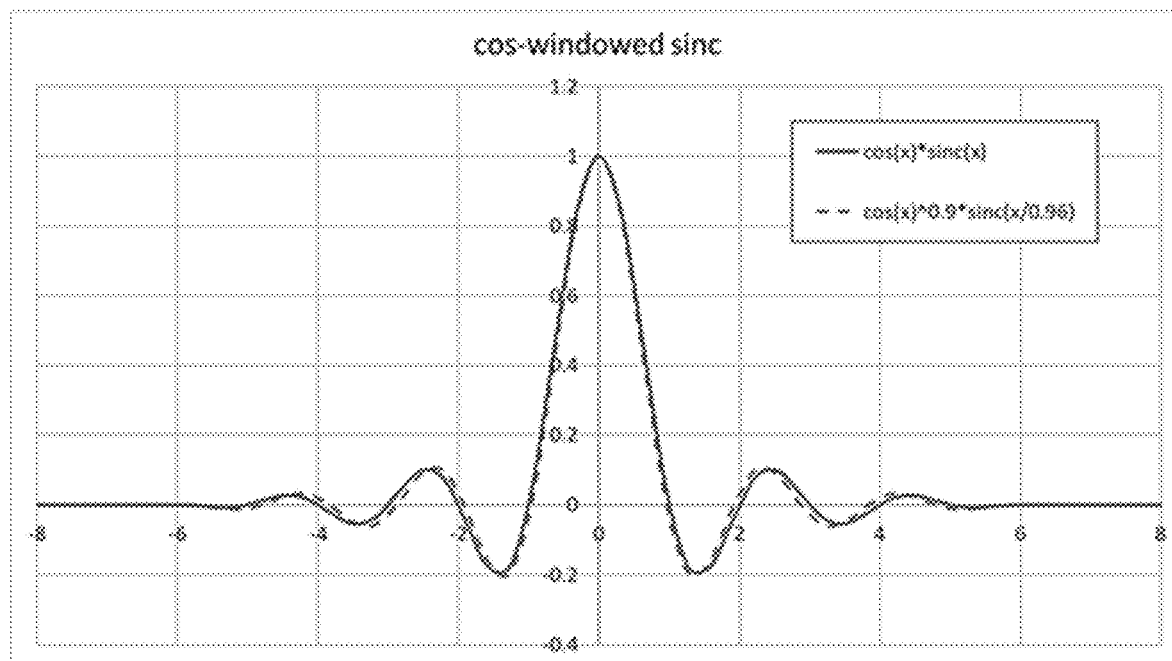
FIG. 9 is a chart illustrating an example of a filter function according to one or more techniques of this disclosure.

FIG. 7 illustrates the effect on the sinc function of using an a smaller than 1. FIG. 8 illustrates the effect on the cos-window of using a b smaller than 1. FIG. 9 illustrates the combined impact of using a and b both slightly lower than 1.

Thus, in one example, according to the techniques herein, a luma sample interpolation process may be based on the following:

Inputs to this Process are:

a luma location in full-sample units (xInt$_L$, yInt$_L$), a luma location in fractional-sample units (xFrac$_L$, yFrac$_L$), a luma location in full-sample units (xSbInt$_L$, ySbInt$_L$) specifying the top-left sample of the bounding block for reference sample padding relative to the top-left luma sample of the reference picture, the luma reference sample array refPicLX$_L$, the half sample interpolation filter index hpelIfIdx, a variable sbWidth specifying the width of the current subblock, a variable sbHeight specifying the height of the current subblock, the decoder-side motion vector refinement flag dmvrFlag, a variable refWraparoundEnabledFlag indicating whether horizontal wrap-around motion compensation is enabled, a fixedpoint representation of the horizontal scaling factor scalingRatio[0], a fixedpoint representation of the vertical scaling factor scalingRatio[1], a luma location (xSb, ySb) specifying the top-left sample of the current subblock relative to the top-left luma sample of the current picture.

a luma location (xCb, yCb) specifying the top-left sample of the current coding block relative to the top left luma sample of the current picture, Output of this process is a predicted luma sample value predSampleLX$_L$ The Variables Shift1, Shift2 and Shift3 are Derived as Follows:

The variable shift1 is set equal to Min (4, BitDepth−8), the variable shift2 is set equal to 6 and the variable shift3 is set equal to Max (2, 14—BitDepth).

The variable picW is set equal to pps_pic_width_in_luma_samples of the reference picture refPicLX and the variable picH is set equal to pps_pic_height_in_luma_samples of the reference picture refPicLX.

The horizontal and vertical half sample interpolation filter indices hpelHorIfIdx and hpelVerIfIdx are derived as follows:

hpelHorIfIdx=(scalingRatio[0]==16384)? hpelIfIdx: 0
hpelVerIfIdx=(scalingRatio[1]==16384)? hpelIfIdx: 0

The horizontal luma interpolation filter coefficients $f_{LH}[p]$ for each 1/16 fractional sample position p equal to $xFrac_L$ or $yFrac_L$ are derived as follows:

If MotionModelIdc[xSb][ySb] is greater than 0, and sbWidth and sbHeight are both equal to 4, and scalingRatio[0] is greater than 28 672, luma interpolation filter coefficients $f_{LH}[p]$ are specified in Table 9.

Otherwise, if MotionModelIdc[xSb][ySb] is greater than 0, and sbWidth and sbHeight are both equal to 4, and scalingRatio[0] is greater than 20 480, luma interpolation filter coefficients $f_{LH}[p]$ are specified in Table 8.

Otherwise, if MotionModelIdc[xSb][ySb] is greater than 0, and sbWidth and sbHeight are both equal to 4, the luma interpolation filter coefficients $f_{LH}[p]$ are specified in Table 7.

Otherwise, if scalingRatio[0] is greater than 28 672, luma interpolation filter coefficients $f_{LH}[p]$ are specified in Table 6.

Otherwise, if scalingRatio[0] is greater than 20 480, luma interpolation filter coefficients $f_{LH}[p]$ are specified in Table 5.

Otherwise, if inter_pred_idc[xCb][yCb] is equal to PRED_BI, and sbWidth and sbHeight are both greater than 4, the luma interpolation filter coefficients $f_{LH}[p]$ are specified in Table 15 (or Table 17, Table 19, Table 21, Table 23, or Table 25) depending on hpelIfIdx set equal to hpelHorIfIdx.

Otherwise, the luma interpolation filter coefficients $f_{LH}[p]$ are specified in Table 4 depending on hpelIfIdx set equal to hpelHorIfIdx.

The vertical luma interpolation filter coefficients $f_{LV}[p]$ for each 1/16 fractional sample position p equal to $yFrac_L$ are derived as follows:

If MotionModelIdc[xSb][ySb] is greater than 0, and sbWidth and sbHeight are both equal to 4, and scalingRatio[1] is greater than 28 672, the luma interpolation filter coefficients $f_{LV}[p]$ are specified in Table 9.

Otherwise, if MotionModelIdc[xSb][ySb] is greater than 0, and sbWidth and sbHeight are both equal to 4, and scalingRatio[1] is greater than 20 480, the luma interpolation filter coefficients $f_{LV}[p]$ are specified in Table 8.

Otherwise, if MotionModelIdc[xSb][ySb] is greater than 0, and sbWidth and sbHeight are both equal to 4, the luma interpolation filter coefficients $f_{LV}[p]$ are specified in Table 7.

Otherwise, if scalingRatio[1] is greater than 28 672, luma interpolation filter coefficients $f_{LV}[p]$ are specified in Table 6.

Otherwise, if scalingRatio[1] is greater than 20 480, luma interpolation filter coefficients $f_{LV}[p]$ are specified in Table 5.

Otherwise, if inter_pred_idc[xCb][yCb] is equal to PRED_BI, and sbWidth and sbHeight are both greater than 4, the luma interpolation filter coefficients $f_{LV}[p]$ are specified in Table 15 (or Table 17, Table 19, Table 21, Table 23, or Table 25) depending on hpelIfIdx set equal to hpelHorIfIdx.

Otherwise, the luma interpolation filter coefficients $f_{LV}[p]$ are specified in Table 4 depending on hpelIfIdx set equal to hpelVerIfIdx.

The luma locations in full-sample units ($xInt_i$, $yInt_i$) are derived as follows for i=0 . . . 7:

$xInt_i = xInt_L + i - 3$
$yInt_i = yInt_L + i - 3$

When dmvrFlag is equal to 1, the following applies:
$xInt_i = Clip3(xSbInt_L - 3, xSbInt_L + sbWidth - 1 + 4, xInt_i)$
$yInt_i = Clip3(ySbInt_L - 3, ySbInt_L + sbHeight - 1 + 4, yInt_i)$ If sps_subpic_treated_as_pic_flag[CurrSubpicIdx] is equal to 1 and sps_num_subpics_minus1 for the reference picture refPicLX is greater than 0, the following applies:

$xInt_i$=Clip3(SubpicLeftBoundaryPos, SubpicRightBoundaryPos, refWraparoundEnabledFlag? ClipH((PpsRefWraparoundOffset)*MinCbSizeY, picW, $xInt_i$): $xInt_i$)

$yInt_i$=Clip3(SubpicTopBoundaryPos, SubpicBotBoundaryPos, $yInt_i$)

Otherwise (sps_subpic_treated_as_pic_flag[CurrSubpicIdx] is equal to 0 or sps_num_subpics_minus1 for the reference picture refPicLX is equal to 0), the following applies:

$xInt_i$=Clip3(0, picW−1, refWraparoundEnabledFlag? ClipH((PpsRefWraparoundOffset)*MinCbSizeY, picW, $xInt_i$): $xInt_i$)

$yInt_i$=Clip3(0, picH-1, $yInt_i$)

The Predicted Luma Sample Value $predSampleLX_L$ is Derived as Follows:

If both $xFrac_L$ and $yFract_L$ are equal to 0, and both scalingRatio[0] and scalingRatio[1] are less than 20481, the value of $predSampleLX_L$ is derived as follows:

$predSampleLX_L = refPicLX_L[xInt_3][yInt_3] << shift3$

Otherwise, if $yFrac_L$ is equal to 0 and scalingRatio[1] is less than 20481, the value of $predSampleLX_L$ is derived as follows:

$$predSampleLX_L = \left(\sum_{i=0}^{7} f_{LH}[xFrac_L][i] * refPicLX_L[xInt_i][yInt_3]\right) >> shift1$$

Otherwise, if $xFract_L$ is equal to 0 and scalingRatio[0] is less than 20481, the value of $predSampleLX_L$ is derived as follows:

$$predSampleLX_L = \left(\sum_{i=0}^{7} f_{LV}[yFrac_L][i] * refPicLX_L[xInt_3][yInt_i]\right) >> shift1$$

Otherwise, the value of $predSampleLX_L$ is derived as follows:
The sample array temp[n] with n=0 . . . 7, is derived as follows:

$$temp[n] = \left(\sum_{i=0}^{7} f_{LH}[xFrac_L][i] * refPicLX_L[xInt_i][yInt_n]\right) >> shift1$$

The predicted luma sample value predSampleLX$_L$ is derived as follows:

$$predSampleLX_L = \left(\sum_{i=0}^{7} f_{LV}[yFrac_L][i] * temp[i]\right) >> shift2$$

Thus, in one example, according to the techniques herein, a luma sample interpolation process may be based on the following:

Inputs to this Process are:
  a luma location in full-sample units (xInt$_L$, yInt$_L$),
  a luma location in fractional-sample units (xFrac$_L$, yFrac$_L$),
  a luma location in full-sample units (xSbInt$_L$, ySbInt$_L$) specifying the top-left sample of the bounding block for reference sample padding relative to the top-left luma sample of the reference picture,
  the luma reference sample array refPicLX$_L$,
  the half sample interpolation filter index hpelIfIdx,
  a variable sbWidth specifying the width of the current subblock,
  a variable sbHeight specifying the height of the current subblock,
  the decoder-side motion vector refinement flag dmvrFlag,
  a variable refWraparoundEnabledFlag indicating whether horizontal wrap-around motion compensation is enabled,
  a fixedpoint representation of the horizontal scaling factor scalingRatio[0],
  a fixedpoint representation of the vertical scaling factor scalingRatio[1],
  a luma location (xSb, ySb) specifying the top-left sample of the current subblock relative to the top-left luma sample of the current picture.
  a luma location (xCb, yCb) specifying the top-left sample of the current coding block relative to the top left luma sample of the current picture,
  Output of this process is a predicted luma sample value predSampleLX$_L$ The Variables Shift1, Shift2 and Shift3 are Derived as Follows:
  The variable shift1 is set equal to Min (4, BitDepth−8), the variable shift2 is set equal to 6 and the variable shift3 is set equal to Max (2, 14-BitDepth).
  The variable picW is set equal to pps_pic_width_in_luma_samples of the reference picture refPicLX and the variable picH is set equal to pps_pic_height_in_luma_samples of the reference picture refPicLX.

The horizontal and vertical half sample interpolation filter indices hpelHorIfIdx and hpelVerIfIdx are derived as follows:
  hpelHorIfIdx=(scalingRatio[0]==16384)? hpelIfIdx: 0
  hpelVerIfIdx=(scalingRatio[1]==16384)? hpelIfIdx: 0

The horizontal luma interpolation filter coefficients f$_{LH}$[p] for each 1/16 fractional sample position p equal to xFrac$_L$ or yFrac$_L$ are derived as follows:
  If MotionModelIdc[xSb][ySb] is greater than 0, and sbWidth and sbHeight are both equal to 4, and scalingRatio[0] is greater than 28 672, luma interpolation filter coefficients f$_{LH}$[p] are specified in Table 9.
  Otherwise, if MotionModelIdc[xSb][ySb] is greater than 0, and sbWidth and sbHeight are both equal to 4, and scalingRatio[0] is greater than 20 480, luma interpolation filter coefficients f$_{LH}$[p] are specified in Table 8.
  Otherwise, if MotionModelIdc[xSb][ySb] is greater than 0, and sbWidth and sbHeight are both equal to 4, the luma interpolation filter coefficients f$_{LH}$[p] are specified in Table 7.
  Otherwise, if scalingRatio[0] is greater than 28 672, luma interpolation filter coefficients f$_{LH}$[p] are specified in Table 6.
  Otherwise, if scalingRatio[0] is greater than 20 480, luma interpolation filter coefficients f$_{LH}$[p] are specified in Table 5.
  Otherwise, if inter_pred_idc[xCb][yCb] is equal to PRED_BI, and either sbWidth or sbHeight is not equal to 4, the luma interpolation filter coefficients f$_{LH}$[p] are specified in Table 15 (or Table 17, Table 19, Table 21, Table 23, or Table 25) depending on hpelIfIdx set equal to hpelHorIfIdx.
  Otherwise, the luma interpolation filter coefficients f$_{LH}$[p] are specified in Table 4 depending on hpelIfIdx set equal to hpelHorIfIdx.

The vertical luma interpolation filter coefficients f$_{LV}$[p] for each 1/16 fractional sample position p equal to yFrac$_L$ are derived as follows:
  If MotionModelIdc[xSb][ySb] is greater than 0, and sbWidth and sbHeight are both equal to 4, and scalingRatio[1] is greater than 28 672, the luma interpolation filter coefficients f$_{LV}$[p] are specified in Table 9.
  Otherwise, if MotionModelIdc[xSb][ySb] is greater than 0, and sbWidth and sbHeight are both equal to 4, and scalingRatio[1] is greater than 20 480, the luma interpolation filter coefficients f$_{LV}$[p] are specified in Table 8.
  Otherwise, if MotionModelIdc[xSb][ySb] is greater than 0, and sbWidth and sbHeight are both equal to 4, the luma interpolation filter coefficients f$_{LV}$[p] are specified in Table 7.
  Otherwise, if scalingRatio[1] is greater than 28 672, luma interpolation filter coefficients f$_{LV}$[p] are specified in Table 6.
  Otherwise, if scalingRatio[1] is greater than 20 480, luma interpolation filter coefficients f$_{LV}$[p] are specified in Table 5.
  Otherwise, if inter_pred_idc[xCb][yCb] is equal to PRED_BI, and either sbWidth or sbHeight is not equal to 4, the luma interpolation filter coefficients f$_{LV}$[p] are specified in Table 15 (or Table 17, Table 19, Table 21, Table 23, or Table 25) depending on hpelIfIdx set equal to hpelHorIfIdx.
  Otherwise, the luma interpolation filter coefficients f$_{LV}$[p] are specified in Table 4 depending on hpelIfIdx set equal to hpelVerIfIdx.

the Luma Locations in Full-Sample Units (xInt$_i$, yInt$_i$) are Derived as Follows for i=0 . . . 7:
  xInt$_i$=xInt$_L$+i−3 yInt$_i$=yInt$_L$+i−3
  When dmvrFlag is equal to 1, the following applies:
    xInt$_i$=Clip3(xSbInt$_L$−3, xSbInt$_L$+sbWidth−1+4, xInt$_i$)
    yInt$_i$=Clip3(ySbInt$_L$−3, ySbInt$_L$+sbHeight−1+4, yInt$_i$)
  If sps_subpic_treated_as_pic_flag[CurrSubpicIdx] is equal to 1 and sps_num_subpics_minus1 for the reference picture refPicLX is greater than 0, the following applies:
    xInt$_i$=Clip3(SubpicLeftBoundaryPos, SubpicRightBoundaryPos, refWraparoundEnabledFlag? ClipH((PpsRefWraparoundOffset)*MinCbSizeY, picW, xInt$_i$): xInt$_i$)
    yInt$_i$=Clip3(SubpicTopBoundaryPos, SubpicBotBoundaryPos, yInt$_i$)

Otherwise (sps_subpic_treated_as_pic_flag[CurrSubpicIdx] is equal to 0 or sps_num_subpics_minus1 for the reference picture refPicLX is equal to 0), the following applies:

xInt$_i$=Clip3(0, picW−1, refWraparoundEnabledFlag? ClipH((PpsRefWraparoundOffset)*MinCbSizeY, picW, xInt$_i$): xInt$_i$)

yInt$_i$=Clip3(0, picH−1, yInt$_i$)

The predicted luma sample value predSampleLX$_L$ is derived as follows:

If both xFrac$_L$ and yFrac$_L$ are equal to 0, and both scalingRatio[0] and scalingRatio[1] are less than 20481, the value of predSampleLX$_L$ is derived as follows:

predSampleLX$_L$=refPicLX$_L$[xInt$_3$][yInt$_3$]<<shift3

Otherwise, if yFrac$_L$ is equal to 0 and scalingRatio[1] is less than 20481, the value of predSampleLX$_L$ is derived as follows:

$$predSampleLX_L = \left(\sum_{i=0}^{7} f_{LH}[xFrac_L][i] * refPicLX_L[xInt_i][yInt_3]\right) >> shift1$$

Otherwise, if xFrac$_L$ is equal to 0 and scalingRatio[0] is less than 20481, the value of predSampleLX$_L$ is derived as follows:

$$predSampleLX_L = \left(\sum_{i=0}^{7} f_{LV}[yFrac_L][i] * refPicLX_L[xInt_3][yInt_i]\right) >> shift1$$

Otherwise, the value of predSampleLX$_L$ is derived as follows:

The sample array temp[n] with n=0 ... 7, is derived as follows:

$$temp[n] = \left(\sum_{i=0}^{7} f_{LH}[xFrac_L][i] * refPicLX_L[xInt_i][yInt_n]\right) >> shift1$$

The predicted luma sample value predSampleLX$_L$ is derived as follows:

$$predSampleLX_L = \left(\sum_{i=0}^{7} f_{LV}[yFrac_L][i] * temp[i]\right) >> shift2$$

Thus, in one example, according to the techniques herein, a luma sample interpolation process may be based on the following:

Inputs to this Process are:
- a luma location in full-sample units (xInt$_L$, yInt$_L$),
- a luma location in fractional-sample units (xFrac$_L$, yFrac$_L$),
- a luma location in full-sample units (xSbInt$_L$, ySbInt$_L$) specifying the top-left sample of the bounding block for reference sample padding relative to the top-left luma sample of the reference picture,
- the luma reference sample array refPicLX$_L$,
- the half sample interpolation filter index hpelIfIdx,
- a variable sbWidth specifying the width of the current subblock,
- a variable sbHeight specifying the height of the current subblock,
- the decoder-side motion vector refinement flag dmvrFlag,
- a variable refWraparoundEnabledFlag indicating whether horizontal wrap-around motion compensation is enabled,
- a fixedpoint representation of the horizontal scaling factor scalingRatio[0], a fixedpoint representation of the vertical scaling factor scalingRatio[1],
- a luma location (xSb, ySb) specifying the top-left sample of the current subblock relative to the top-left luma sample of the current picture.
- a luma location (xCb, yCb) specifying the top-left sample of the current coding block relative to the top left luma sample of the current picture, Output of this process is a predicted luma sample value predSampleLX$_L$ the Variables Shift1, Shift2 and Shift3 are Derived as Follows:

The variable shift1 is set equal to Min (4, BitDepth−8), the variable shift2 is set equal to 6 and the variable shift3 is set equal to Max (2, 14—BitDepth).

The variable picW is set equal to pps_pic_width_in_luma_samples of the reference picture refPicLX and the variable picH is set equal to pps_pic_height_in_luma_samples of the reference picture refPicLX.

The horizontal and vertical half sample interpolation filter indices hpelHorIfIdx and hpelVerIfIdx are derived as follows:

hpelHorIfIdx=(scalingRatio[0]==16384)? hpelIfIdx: 0
hpelVerIfIdx=(scalingRatio[1]==16384)? hpelIfIdx: 0

The horizontal luma interpolation filter coefficients f$_{LH}$[p] for each 1/16 fractional sample position p equal to xFrac$_L$ or yFrac$_L$ are derived as follows:

If MotionModelIdc[xSb][ySb] is greater than 0, and sbWidth and sbHeight are both equal to 4, and scalingRatio[0] is greater than 28 672, luma interpolation filter coefficients f$_{LH}$[p] are specified in Table 9.

Otherwise, if MotionModelIdc[xSb][ySb] is greater than 0, and sbWidth and sbHeight are both equal to 4, and scalingRatio[0] is greater than 20 480, luma interpolation filter coefficients f$_{LH}$[p] are specified in Table 8.

Otherwise, if MotionModelIdc[xSb][ySb] is greater than 0, and sbWidth and sbHeight are both equal to 4, the luma interpolation filter coefficients f$_{LH}$[p] are specified in Table 7.

Otherwise, if scalingRatio[0] is greater than 28 672, luma interpolation filter coefficients f$_{LH}$[p] are specified in Table 6.

Otherwise, if scalingRatio[0] is greater than 20 480, luma interpolation filter coefficients f$_{LH}$[p] are specified in Table 5.

Otherwise, if inter_pred_idc[xCb][yCb] is equal to PRED_BI, and either sbWidth or sbHeight is greater than 4, the luma interpolation filter coefficients f$_{LH}$[p] are specified in Table 15 (or Table 17, Table 19, Table 21, Table 23, or Table 25) depending on hpelIfIdx set equal to hpelHorIfIdx.

Otherwise, the luma interpolation filter coefficients f$_{LH}$[p] are specified in Table 4 depending on hpelIfIdx set equal to hpelHorIfIdx.

The vertical luma interpolation filter coefficients f$_{LV}$[p] for each 1/16 fractional sample position p equal to yFrac$_L$ are derived as follows:

If MotionModelIdc[xSb][ySb] is greater than 0, and sbWidth and sbHeight are both equal to 4, and scalingRatio[1] is greater than 28 672, the luma interpolation filter coefficients f$_{LV}$[p] are specified in Table 9.

Otherwise, if MotionModelIdc[xSb][ySb] is greater than 0, and sbWidth and sbHeight are both equal to 4, and scalingRatio[1] is greater than 20 480, the luma interpolation filter coefficients $f_{LV}[p]$ are specified in Table 8.

Otherwise, if MotionModelIdc[xSb][ySb] is greater than 0, and sbWidth and sbHeight are both equal to 4, the luma interpolation filter coefficients $f_{LV}[p]$ are specified in Table 7.

Otherwise, if scalingRatio[1] is greater than 28 672, luma interpolation filter coefficients $f_{LV}[p]$ are specified in Table 6.

Otherwise, if scalingRatio[1] is greater than 20 480, luma interpolation filter coefficients $f_{LV}[p]$ are specified in Table 5.

Otherwise, if inter_pred_idc[xCb][yCb] is equal to PRED_BI, and either sbWidth or sbHeight is greater than 4, the luma interpolation filter coefficients $f_{LV}[p]$ are specified in Table 15 (or Table 17, Table 19, Table 21, Table 23, or Table 25) depending on hpelIfIdx set equal to hpelHorIfIdx.

Otherwise, the luma interpolation filter coefficients $f_{LV}[p]$ are specified in Table 4 depending on hpelIfIdx set equal to hpelVerIfIdx.

The luma locations in full-sample units ($xInt_i$, $yInt_i$) are derived as follows for i=0 . . . 7:

$xInt_i = xInt_L + i - 3$
$yInt_i = yInt_L + i - 3$

When dmvrFlag is equal to 1, the following applies:
$xInt_i = Clip3(xSbInt_L - 3, xSbInt_L + sbWidth - 1 + 4, xInt_i)$
$yInt_i = Clip3(ySbInt_L - 3, ySbInt_L + sbHeight - 1 + 4, yInt_i)$ If sps_subpic_treated_as_pic_flag[CurrSubpicIdx] is equal to 1 and sps_num_subpics_minus1 for the reference picture refPicLX is greater than 0, the following applies:
$xInt_i = Clip3(SubpicLeftBoundaryPos,$ SubpicRightBoundaryPos, refWraparoundEnabledFlag? ClipH((PpsRefWraparoundOffset)*MinCbSizeY, picW, $xInt_i$): $xInt_i$)
$yInt_i = Clip3(SubpicTopBoundaryPos,$ SubpicBotBoundaryPos, $yInt_i$)

Otherwise (sps_subpic_treated_as_pic_flag[CurrSubpicIdx] is equal to 0 or sps_num_subpics_minus1 for the reference picture refPicLX is equal to 0), the following applies:
$xInt_i = Clip3(0, picW-1, refWraparoundEnabledFlag?$ ClipH((PpsRefWraparoundOffset)*MinCbSizeY, picW, $xInt_i$): $xInt_i$)
$yInt_i = Clip3(0, picH-1, yInt_i)$ The predicted luma sample value $predSampleLX_L$ is derived as follows:

If both $xFrac_L$ and $yFrac_L$ are equal to 0, and both scalingRatio[0] and scalingRatio[1] are less than 20481, the value of $predSampleLX_L$ is derived as follows:
$predSampleLX_L = refPicLX_L[xInt_3][yInt_3] << shift3$ Otherwise, if $yFrac_L$ is equal to 0 and scalingRatio[1] is less than 20481, the value of $predSampleLX_L$ is derived as follows:

$predSampleLX_L =$
$$\left(\sum_{i=0}^{7} f_{LH}[xFrac_L][i] * refPicLX_L[xInt_i][yInt_3]\right) >> \text{shift1}$$

Otherwise, if $xFrac_L$ is equal to 0 and scalingRatio[0] is less than 20481, the value of $predSampleLX_L$ is derived as follows:

$predSampleLX_L =$
$$\left(\sum_{i=0}^{7} f_{LV}[yFrac_L][i] * refPicLX_L[xInt_3][yInt_i]\right) >> \text{shift1}$$

Otherwise, the value of $predSampleLX_L$ is derived as follows:
The sample array temp[n] with n=0 . . . 7, is derived as follows:

$$temp[n] = \left(\sum_{i=0}^{7} f_{LH}[xFrac_L][i] * refPicLX_L[xInt_i][yInt_n]\right) >> \text{shift1}$$

The predicted luma sample value $predSampleLX_L$ is derived as follows:

$$predSampleLX_L = \left(\sum_{i=0}^{7} f_{LV}[yFrac_L][i] * temp[i]\right) >> \text{shift2}$$

Thus, in one example, according to the techniques herein, a luma sample interpolation process may be based on the following:

Inputs to this Process are:
a luma location in full-sample units ($xInt_L$, $yInt_L$),
a luma location in fractional-sample units ($xFract_L$, $yFrac_L$),
a luma location in full-sample units ($xSbInt_L$, $ySbInt_L$) specifying the top-left sample of the bounding block for reference sample padding relative to the top-left luma sample of the reference picture,
the luma reference sample array $refPicLX_L$,
the half sample interpolation filter index hpelIfIdx,
a variable sbWidth specifying the width of the current subblock,
a variable sbHeight specifying the height of the current subblock,
the decoder-side motion vector refinement flag dmvrFlag,
a variable refWraparoundEnabledFlag indicating whether horizontal wrap-around motion compensation is enabled,
a fixedpoint representation of the horizontal scaling factor scalingRatio[0],
a fixedpoint representation of the vertical scaling factor scalingRatio[1],
a luma location (xSb, ySb) specifying the top-left sample of the current subblock relative to the top-left luma sample of the current picture.
a luma location (xCb, yCb) specifying the top-left sample of the current coding block relative to the top left luma sample of the current picture, Output of this process is a predicted luma sample value $predSampleLX_L$ the Variables Shift1, Shift2 and Shift3 are Derived as Follows:
The variable shift1 is set equal to Min (4, BitDepth−8), the variable shift2 is set equal to 6 and the variable shift3 is set equal to Max (2, 14—BitDepth).
The variable picW is set equal to pps_pic_width_in_luma_samples of the reference picture refPicLX and the variable picH is set equal to pps_pic_height_in_luma_samples of the reference picture refPicLX.

The horizontal and vertical half sample interpolation filter indices hpelHorIfIdx and hpelVerIfIdx are derived as follows:

hpelHorIfIdx=(scalingRatio[0]==16384)? hpelIfIdx: 0
hpelVerIfIdx=(scalingRatio[1]==16384)? hpelIfIdx: 0

The horizontal luma interpolation filter coefficients $f_{LH}[p]$ for each 1/16 fractional sample position p equal to $xFrac_L$ or $yFrac_L$ are derived as follows:

If MotionModelIdc[xSb][ySb] is greater than 0, and sbWidth and sbHeight are both equal to 4, and scalingRatio[0] is greater than 28 672, luma interpolation filter coefficients $f_{LH}[p]$ are specified in Table 9.

Otherwise, if MotionModelIdc[xSb][ySb] is greater than 0, and sbWidth and sbHeight are both equal to 4, and scalingRatio[0] is greater than 20 480, luma interpolation filter coefficients $f_{LH}[p]$ are specified in Table 8.

Otherwise, if MotionModelIdc[xSb][ySb] is greater than 0, and sbWidth and sbHeight are both equal to 4, the luma interpolation filter coefficients $f_{LH}[p]$ are specified in Table 7.

Otherwise, if scalingRatio[0] is greater than 28 672, luma interpolation filter coefficients $f_{LH}[p]$ are specified in Table 6.

Otherwise, if scalingRatio[0] is greater than 20 480, luma interpolation filter coefficients $f_{LH}[p]$ are specified in Table 5.

Otherwise, if inter_pred_idc[xCb][yCb] is equal to PRED_BI and sbWidth*sbHeight is greater than 16, the luma interpolation filter coefficients $f_{LH}[p]$ are specified in Table 15 (or Table 17, Table 19, Table 21, Table 23, or Table 25) depending on hpelIfIdx set equal to hpelHorIfIdx.

Otherwise, the luma interpolation filter coefficients $f_{LH}[p]$ are specified in Table 4 depending on hpelIfIdx set equal to hpelHorIfIdx.

The vertical luma interpolation filter coefficients $f_{LV}[p]$ for each 1/16 fractional sample position p equal to $yFrac_L$ are derived as follows:

If MotionModelIdc[xSb][ySb] is greater than 0, and sbWidth and sbHeight are both equal to 4, and scalingRatio[1] is greater than 28 672, the luma interpolation filter coefficients $f_{LV}[p]$ are specified in Table 9.

Otherwise, if MotionModelIdc[xSb][ySb] is greater than 0, and sbWidth and sbHeight are both equal to 4, and scalingRatio[1] is greater than 20 480, the luma interpolation filter coefficients $f_{LV}[p]$ are specified in Table 8.

Otherwise, if MotionModelIdc[xSb][ySb] is greater than 0, and sbWidth and sbHeight are both equal to 4, the luma interpolation filter coefficients $f_{LV}[p]$ are specified in Table 7.

Otherwise, if scalingRatio[1] is greater than 28 672, luma interpolation filter coefficients $f_{LV}[p]$ are specified in Table 6.

Otherwise, if scalingRatio[1] is greater than 20 480, luma interpolation filter coefficients $f_{LV}[p]$ are specified in Table 5.

Otherwise, if inter_pred_idc[xCb][yCb] is equal to PRED_BI and sbWidth*sbHeight is greater than 16, the luma interpolation filter coefficients $f_{LV}[p]$ are specified in Table 15 (or Table 17, Table 19, Table 21, Table 23, or Table 25) depending on hpelIfIdx set equal to hpelHorIfIdx.

Otherwise, the luma interpolation filter coefficients $f_{LV}[p]$ are specified in Table 4 depending on hpelIfIdx set equal to hpelVerIfIdx.

the Luma Locations in Full-Sample Units ($xInt_i$, $yInt_i$) are Derived as Follows for i=0 . . . 7:

$xInt_i = xInt_L + i - 3$ $yInt_i = yInt_L + i - 3$

When dmvrFlag is equal to 1, the following applies:

$xInt_i = Clip3(xSbInt_L - 3, xSbInt_L + sbWidth - 1 + 4, xInt_i)$
$yInt_i = Clip3(ySbInt_L - 3, ySbInt_L + sbHeight - 1 + 4, yInt_i)$ If sps_subpic_treated_as_pic_flag[CurrSubpicIdx] is equal to 1 and sps_num_subpics_minus1 for the reference picture refPicLX is greater than 0, the following applies:

$xInt_i$=Clip3(SubpicLeftBoundaryPos, SubpicRightBoundaryPos, refWraparoundEnabledFlag? ClipH((PpsRefWraparoundOffset)*MinCbSizeY, picW, $xInt_i$): $xInt_i$)

$yInt_i$=Clip3(SubpicTopBoundaryPos, SubpicBotBoundaryPos, $yInt_i$)

Otherwise (sps_subpic_treated_as_pic_flag[CurrSubpicIdx] is equal to 0 or sps_num_subpics_minus1 for the reference picture refPicLX is equal to 0), the following applies:

$xInt_i$=Clip3(0, picW−1, refWraparoundEnabledFlag? ClipH((PpsRefWraparoundOffset)*MinCbSizeY, picW, $xInt_i$): $xInt_i$)

$yInt_i$=Clip3(0, picH−1, $yInt_i$)

The Predicted Luma Sample Value $predSampleLX_L$ is Derived as Follows:

If both $xFrac_L$ and $yFrac_L$ are equal to 0, and both scalingRatio[0] and scalingRatio[1] are less than 20481, the value of $predSampleLX_L$ is derived as follows:

$predSampleLX_L = refPicLX_L[xInt_3][yInt_3] << shift3$

Otherwise, if $yFrac_L$ is equal to 0 and scalingRatio[1] is less than 20481, the value of $predSampleLX_L$, is derived as follows:

$$predSampleLX_L = \left(\sum_{i=0}^{7} f_{LH}[xFrac_L][i] * refPicLX_L[xInt_i][yInt_3]\right) >> shift1$$

Otherwise, if $xFract_L$ is equal to 0 and scalingRatio[0] is less than 20481, the value of $predSampleLX_L$ is derived as follows:

$$predSampleLX_L = \left(\sum_{i=0}^{7} f_{LV}[yFrac_L][i] * refPicLX_L[xInt_3][yInt_i]\right) >> shift1$$

Otherwise, the value of $predSampleLX_L$, is derived as follows:

The sample array temp[n] with n=0 . . . 7, is derived as follows:

$$temp[n] = \left(\sum_{i=0}^{7} f_{LH}[xFrac_L][i] * refPicLX_L[xInt_i][yInt_n]\right) >> shift1$$

The predicted luma sample value predSampleLX$_L$ is derived as follows:

$$predSampleLX_L = \left(\sum_{i=0}^{7} f_{LV}[yFrac_L][i] * temp[i]\right) >> shift2$$

In other examples, one or more different thresholds may be applied to determine if the filter in Table 15 (or Table 17, Table 19, Table 21, Table 23, or Table 25) should be applied or not. As an example, values other than 4, such as, 8 or 16, may be used to determine if the filter in Table 15 (or Table 17, Table 19, Table 21, Table 23, or Table 25) should be applied or not. As another example, the total number of samples in the block (i.e. width*height) may be used to determine if the filter in Table 15 (or Table 17, Table 19, Table 21, Table 23, or Table 25) should be applied or not. As another example, a combination of thresholds for width, height and total number of samples may be used to determine if the filter in Table 15 (or Table 17, Table 19, Table 21, Table 23, or Table 25) should be applied or not. As another example, different comparison operators such as >=, <=, !=, ==, may be used when determining if the filter in Table 15 (or Table 17, Table 19, Table 21, Table 23, or Table 25) should be applied or not. That is, according to the techniques herein, whether a condition based on a subblock width and a subblock height is satisfied may be used to determine whether a filter should be applied or not, including, for example, the filter in Table 15 (or Table 17, Table 19, Table 21, Table 23, or Table 25). Further, in some examples, in a case when a filter is not applied, another filter may be applied or no filter may be applied.

In other examples, according to the techniques herein, additional MC filters that may be used for bi-predicted blocks are provided in Table 17 and Table 19. It should be noted that Table 17 and Table 19 provide sharper MC filters created from a cos-windowed sinc function of the form y=cos ^a(x)*sinc(x/b) where one or both of a and b are not equal to 1. In the example corresponding to Table 17 a is set equal to 0.9 and b is set according to Table 18. In the example corresponding to Table 19 a is set equal to 0.9 and b is set according to Table 20.

TABLE 17

| 1/16 | −1 | 2  | −4  | 7  | −15 | 255 | 16  | −7  | 4  | −2  | 1 | 0  |
|------|----|----|-----|----|-----|-----|-----|-----|----|-----|---|----|
| 2/16 | −2 | 5  | −8  | 14 | −28 | 251 | 33  | −14 | 7  | −4  | 2 | 0  |
| 3/16 | −3 | 7  | −12 | 20 | −39 | 244 | 52  | −20 | 10 | −5  | 2 | 0  |
| 4/16 | −3 | 8  | −14 | 25 | −47 | 233 | 72  | −26 | 13 | −7  | 3 | −1 |
| 5/16 | −3 | 9  | −16 | 27 | −52 | 220 | 93  | −33 | 16 | −8  | 4 | −1 |
| 6/16 | −3 | 8  | −16 | 28 | −54 | 204 | 116 | −39 | 19 | −10 | 4 | −1 |
| 7/16 | −2 | 8  | −15 | 27 | −53 | 183 | 139 | −45 | 22 | −12 | 5 | −1 |
| 8/16 | −2 | 6  | −13 | 25 | −50 | 162 | 162 | −50 | 25 | −13 | 6 | −2 |
| 9/16 | −1 | 5  | −12 | 22 | −45 | 139 | 183 | −53 | 27 | −15 | 8 | −2 |
| 10/16| −1 | 4  | −10 | 19 | −39 | 116 | 204 | −54 | 28 | −16 | 8 | −3 |
| 11/16| −1 | 4  | −8  | 16 | −33 | 93  | 220 | −52 | 27 | −16 | 9 | −3 |
| 12/16| −1 | 3  | −7  | 13 | −26 | 72  | 233 | −47 | 25 | −14 | 8 | −3 |
| 13/16| 0  | 2  | −5  | 10 | −20 | 52  | 244 | −39 | 20 | −12 | 7 | −2 |
| 14/16| 0  | 2  | −4  | 7  | −14 | 33  | 251 | −28 | 14 | −8  | 5 | −2 |
| 15/16| 0  | 1  | −2  | 4  | −7  | 16  | 255 | −15 | 7  | −4  | 2 | −1 |

TABLE 18

| phase | b |
|-------|---|
| 1/16  | 0.9985156508839701 |
| 2/16  | 0.9942885822331378 |
| 3/16  | 0.9879623269311193 |
| 4/16  | 0.9804999999999999 |

TABLE 18-continued

| phase | b |
|-------|---|
| 5/16  | 0.9730376730688807 |
| 6/16  | 0.9667114177668623 |
| 7/16  | 0.9624843491160299 |
| 8/16  | 0.961 |
| 9/16  | 0.9624843491160299 |
| 10/16 | 0.9667114177668623 |
| 11/16 | 0.9730376730688807 |
| 12/16 | 0.9804999999999999 |
| 13/16 | 0.9879623269311193 |
| 14/16 | 0.9942885822331378 |
| 15/16 | 0.9985156508839701 |

TABLE 19

| 1/16 | −1 | 3  | −5  | 8  | −16 | 256 | 15  | −6  | 3  | −2  | 1 | 0  |
|------|----|----|-----|----|-----|-----|-----|-----|----|-----|---|----|
| 2/16 | −2 | 5  | −9  | 15 | −29 | 252 | 33  | −13 | 6  | −3  | 1 | 0  |
| 3/16 | −3 | 7  | −12 | 20 | −40 | 245 | 51  | −19 | 10 | −5  | 2 | 0  |
| 4/16 | −3 | 8  | −14 | 24 | −47 | 233 | 72  | −26 | 13 | −7  | 3 | 0  |
| 5/16 | −3 | 9  | −16 | 27 | −52 | 220 | 93  | −33 | 16 | −8  | 4 | −1 |
| 6/16 | −3 | 8  | −16 | 28 | −54 | 202 | 116 | −39 | 20 | −10 | 5 | −1 |
| 7/16 | −2 | 8  | −15 | 27 | −53 | 183 | 138 | −45 | 23 | −12 | 5 | −1 |
| 8/16 | −2 | 6  | −13 | 25 | −50 | 162 | 162 | −50 | 25 | −13 | 6 | −2 |
| 9/16 | −1 | 5  | −12 | 23 | −45 | 138 | 183 | −53 | 27 | −15 | 8 | −2 |
| 10/16| −1 | 5  | −10 | 20 | −39 | 116 | 202 | −54 | 28 | −16 | 8 | −3 |
| 11/16| −1 | 4  | −8  | 16 | −33 | 93  | 220 | −52 | 27 | −16 | 9 | −3 |
| 12/16| 0  | 3  | −7  | 13 | −26 | 72  | 233 | −47 | 24 | −14 | 8 | −3 |
| 13/16| 0  | 2  | −5  | 10 | −19 | 51  | 245 | −40 | 20 | −12 | 7 | −3 |
| 14/16| 0  | 2  | −3  | 6  | −13 | 33  | 252 | −29 | 15 | −9  | 5 | −2 |
| 15/16| 0  | 1  | −2  | 3  | −6  | 15  | 256 | −16 | 8  | −5  | 3 | −1 |

TABLE 20

| phase | b |
|-------|---|
| 1/16  | 0.995 |
| 2/16  | 0.99 |
| 3/16  | 0.985 |
| 4/16  | 0.98 |
| 5/16  | 0.975 |
| 6/16  | 0.97 |
| 7/16  | 0.965 |
| 8/16  | 0.96 |
| 9/16  | 0.965 |
| 10/16 | 0.97 |
| 11/16 | 0.975 |
| 12/16 | 0.98 |
| 13/16 | 0.985 |
| 14/16 | 0.99 |
| 15/16 | 0.995 |

In other examples, according to the techniques herein, additional MC filters that may be used for bi-predicted blocks are provided in Table 21, Table 23 and Table 25. It should be noted that Table 21, Table 23, and Table 25 provide sharper MC filters created from a cos-windowed sinc function of the form y=cos ^a(x)*sinc(x/b) where one or both of a and b are not equal to 1. In the example corresponding to Table 21, a and b are set according to Table 22. In the example corresponding to Table 23, a and b are set according to Table 24. In the example corresponding to Table 25, a and b are set according to Table 26.

TABLE 21

| 1/16 | −1 | 3 | −5  | 8  | −16 | 256 | 15 | −6  | 3  | −1 | 0 | 0  |
|------|----|---|-----|----|-----|-----|----|-----|----|----|---|----|
| 2/16 | −2 | 5 | −9  | 15 | −30 | 253 | 32 | −12 | 5  | −2 | 1 | 0  |
| 3/16 | −3 | 7 | −12 | 21 | −40 | 244 | 50 | −18 | 9  | −4 | 2 | 0  |
| 4/16 | −3 | 8 | −15 | 25 | −48 | 235 | 71 | −25 | 12 | −6 | 2 | 0  |
| 5/16 | −3 | 9 | −16 | 28 | −53 | 220 | 93 | −32 | 16 | −8 | 3 | −1 |

TABLE 21-continued

| | | | | | | | | | | | |
|---|---|---|---|---|---|---|---|---|---|---|---|
| 6/16 | −3 | 8 | −16 | 28 | −54 | 204 | 116 | −39 | 19 | −10 | 4 | −1 |
| 7/16 | −2 | 8 | −15 | 27 | −53 | 183 | 139 | −45 | 22 | −12 | 5 | −1 |
| 8/16 | −2 | 6 | −13 | 25 | −50 | 162 | 162 | −50 | 25 | −13 | 6 | −2 |
| 9/16 | −1 | 5 | −12 | 22 | −45 | 139 | 183 | −53 | 27 | −15 | 8 | −2 |
| 10/16 | −1 | 4 | −10 | 19 | −39 | 116 | 204 | −54 | 28 | −16 | 8 | −3 |
| 11/16 | −1 | 3 | −8 | 16 | −32 | 93 | 220 | −53 | 28 | −16 | 9 | −3 |
| 12/16 | 0 | 2 | −6 | 12 | −25 | 71 | 235 | −48 | 25 | −15 | 8 | −3 |
| 13/16 | 0 | 2 | −4 | 9 | −18 | 50 | 244 | −40 | 21 | −12 | 7 | −3 |
| 14/16 | 0 | 1 | −2 | 5 | −12 | 32 | 253 | −30 | 15 | −9 | 5 | −2 |
| 15/16 | 0 | 0 | −1 | 3 | −6 | 15 | 256 | −16 | 8 | −5 | 3 | −1 |

TABLE 22

| phase | a | b |
|---|---|---|
| 1/16 | 0.992929927 | 0.987334793 |
| 2/16 | 0.986131552 | 0.96959133 |
| 3/16 | 0.979866135 | 0.950629614 |
| 4/16 | 0.97437445 | 0.932448287 |
| 5/16 | 0.969867541 | 0.9166115 |
| 6/16 | 0.966518606 | 0.904367433 |
| 7/16 | 0.964456341 | 0.896640122 |
| 8/16 | 0.96376 | 0.894 |
| 9/16 | 0.964456341 | 0.896640122 |
| 10/16 | 0.966518606 | 0.904367433 |
| 11/16 | 0.969867541 | 0.9166115 |
| 12/16 | 0.97437445 | 0.932448287 |
| 13/16 | 0.979866135 | 0.950629614 |
| 14/16 | 0.986131552 | 0.96959133 |
| 15/16 | 0.992929927 | 0.987334793 |

TABLE 23

| | | | | | | | | | | | |
|---|---|---|---|---|---|---|---|---|---|---|---|
| 1/16 | −1 | 3 | −5 | 8 | −16 | 256 | 15 | −6 | 3 | −2 | 1 | 0 |
| 2/16 | −2 | 5 | −9 | 15 | −29 | 252 | 33 | −13 | 6 | −3 | 1 | 0 |
| 3/16 | −3 | 7 | −12 | 20 | −40 | 245 | 52 | −20 | 10 | −5 | 2 | 0 |
| 4/16 | −3 | 8 | −15 | 25 | −47 | 234 | 72 | −26 | 13 | −7 | 3 | −1 |
| 5/16 | −3 | 9 | −16 | 27 | −52 | 220 | 93 | −33 | 17 | −9 | 4 | −1 |
| 6/16 | −3 | 9 | −16 | 28 | −54 | 202 | 115 | −39 | 20 | −10 | 5 | −1 |
| 7/16 | −3 | 8 | −15 | 27 | −53 | 183 | 138 | −45 | 23 | −12 | 6 | −1 |
| 8/16 | −2 | 6 | −13 | 25 | −50 | 162 | 162 | −50 | 25 | −13 | 6 | −2 |
| 9/16 | −1 | 6 | −12 | 23 | −45 | 138 | 183 | −53 | 27 | −15 | 8 | −3 |
| 10/16 | −1 | 5 | −10 | 20 | −39 | 115 | 202 | −54 | 28 | −16 | 9 | −3 |
| 11/16 | −1 | 4 | −9 | 17 | −33 | 93 | 220 | −52 | 27 | −16 | 9 | −3 |
| 12/16 | −1 | 3 | −7 | 13 | −26 | 72 | 234 | −47 | 25 | −15 | 8 | −3 |
| 13/16 | 0 | 2 | −5 | 10 | −20 | 52 | 245 | −40 | 20 | −12 | 7 | −3 |
| 14/16 | 0 | 1 | −3 | 6 | −13 | 33 | 252 | −29 | 15 | −9 | 5 | −2 |
| 15/16 | 0 | 1 | −2 | 3 | −6 | 15 | 256 | −16 | 8 | −5 | 3 | −1 |

TABLE 24

| phase | a | b |
|---|---|---|
| 1/16 | 0.995045 | 0.8735 |
| 2/16 | 0.99009 | 0.8735 |
| 3/16 | 0.985135 | 0.8735 |
| 4/16 | 0.98018 | 0.8735 |
| 5/16 | 0.975225 | 0.8735 |
| 6/16 | 0.97027 | 0.8735 |
| 7/16 | 0.965315 | 0.8735 |
| 8/16 | 0.96036 | 0.8735 |
| 9/16 | 0.965315 | 0.8735 |
| 10/16 | 0.97027 | 0.8735 |
| 11/16 | 0.975225 | 0.8735 |
| 12/16 | 0.98018 | 0.8735 |
| 13/16 | 0.985135 | 0.8735 |
| 14/16 | 0.99009 | 0.8735 |
| 15/16 | 0.995045 | 0.8735 |

TABLE 25

| | | | | | | | | | | | |
|---|---|---|---|---|---|---|---|---|---|---|---|
| 1/16 | −1 | 3 | −5 | 8 | −16 | 256 | 15 | −6 | 3 | −1 | 0 | 0 |
| 2/16 | −2 | 5 | −9 | 16 | −30 | 253 | 31 | −12 | 5 | −2 | 1 | 0 |
| 3/16 | −3 | 7 | −13 | 21 | −41 | 247 | 50 | −18 | 9 | −4 | 1 | 0 |
| 4/16 | −3 | 8 | −15 | 26 | −48 | 235 | 70 | −25 | 12 | −6 | 2 | 0 |
| 5/16 | −3 | 9 | −16 | 28 | −53 | 221 | 93 | −32 | 15 | −8 | 3 | −1 |
| 6/16 | −3 | 9 | −16 | 28 | −54 | 204 | 115 | −39 | 19 | −10 | 4 | −1 |
| 7/16 | −3 | 8 | −15 | 28 | −53 | 183 | 139 | −45 | 22 | −12 | 5 | −1 |
| 8/16 | −2 | 6 | −13 | 25 | −50 | 162 | 162 | −50 | 25 | −13 | 6 | −2 |
| 9/16 | −1 | 5 | −12 | 22 | −45 | 139 | 183 | −53 | 28 | −15 | 8 | −3 |
| 10/16 | −1 | 4 | −10 | 19 | −39 | 115 | 204 | −54 | 28 | −16 | 9 | −3 |
| 11/16 | −1 | 3 | −8 | 15 | −32 | 93 | 221 | −53 | 28 | −16 | 9 | −3 |
| 12/16 | 0 | 2 | −6 | 12 | −25 | 70 | 235 | −48 | 26 | −15 | 8 | −3 |
| 13/16 | 0 | 1 | −4 | 9 | −18 | 50 | 247 | −41 | 21 | −13 | 7 | −3 |
| 14/16 | 0 | 1 | −2 | 5 | −12 | 31 | 253 | −30 | 16 | −9 | 5 | −2 |
| 15/16 | 0 | 0 | −1 | 3 | −6 | 15 | 256 | −16 | 8 | −5 | 3 | −1 |

TABLE 26

| phase | a | b |
|---|---|---|
| 1/16 | 0.992516335 | 0.983093143 |
| 2/16 | 0.985320264 | 0.959407294 |
| 3/16 | 0.978688326 | 0.934095192 |
| 4/16 | 0.972875384 | 0.909824836 |
| 5/16 | 0.968104826 | 0.888684219 |
| 6/16 | 0.964559981 | 0.872339545 |
| 7/16 | 0.962377077 | 0.862024314 |
| 8/16 | 0.96164 | 0.8585 |
| 9/16 | 0.962377077 | 0.862024314 |
| 10/16 | 0.964559981 | 0.872339545 |
| 11/16 | 0.968104826 | 0.888684219 |
| 12/16 | 0.972875384 | 0.909824836 |
| 13/16 | 0.978688326 | 0.934095192 |
| 14/16 | 0.985320264 | 0.959407294 |
| 15/16 | 0.992516335 | 0.983093143 |

In one example, according to the techniques herein, which MC filter to use may be determined based on a slice type (B slice or P slice). In one example, according to the techniques herein, which MC filter to use may be determined based on signalled information. Signalled information may, for example, include one or more slice header flags, one or more picture header flags, one or more picture parameter set flags, one or more sequence parameter set flags, and one or more video parameter set flags. In one example, if such flag(s) exist in multiple different places in the hierarchy, a lower level flag may override a higher level flag. For example, a slice level may override a picture parameter set flag. In one example, two separate flags may be signalled to indicate which out of two MC filters is used for uni-prediction and bi-prediction, respectively. In one example, a single flag may be used to indicate if the sharper MC filter is used for both bi-predicted blocks and uni-predicted blocks or if the sharper MC filter is used only for bi-predicted blocks.

In this manner, video encoder 600 represents an example of a device configured to determine whether a subblock is predicted using uni-prediction or bi-prediction, select a first motion compensation interpolation filter based on the subblock being predicted using uni-prediction, and select a second motion compensation interpolation filter based on the subblock being predicted using bi-prediction and whether a condition based on a subblock width and a subblock height is satisfied, wherein the first and second motion compensation interpolation filters are defined according to cos-windowed sinc function and the first and second motion compensation interpolation filters have a distinct window and scale for the cos-windowed sinc function.

Referring again to FIG. 1, interface 108 may include any device configured to receive data generated by data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 1, destination device 120 includes interface 122, data decapsulator 123, video decoder 124, and display 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Data decapsulator 123 may be configured to receive and parse any of the example syntax structures described herein.

Video decoder 124 may include any device configured to receive a bitstream (e.g., a sub-bitstream extraction) and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 10:
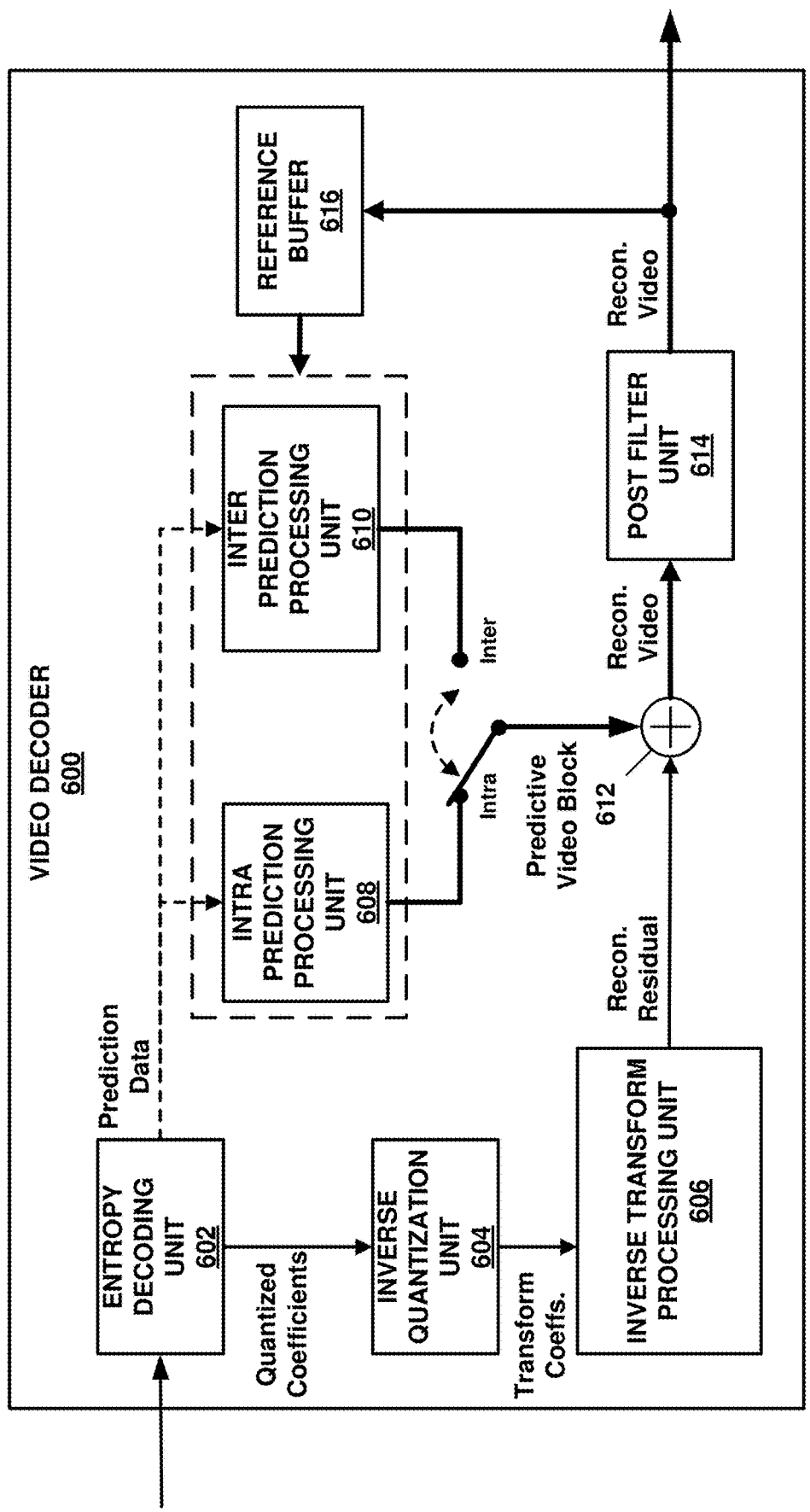
FIG. 10 is a block diagram illustrating an example of a video decoder that may be configured to decode video data according to one or more techniques of this disclosure.

FIG. 10 is a block diagram illustrating an example of a video decoder that may be configured to decode video data according to one or more techniques of this disclosure (e.g., the decoding process for reference-picture list construction described above). In one example, video decoder 600 may be configured to decode transform data and reconstruct residual data from transform coefficients based on decoded transform data. Video decoder 600 may be configured to perform intra prediction decoding and inter prediction decoding and, as such, may be referred to as a hybrid decoder. Video decoder 600 may render a picture based on or according to the processes described above, and further based on filters in the tables provided above.

In the example illustrated in FIG. 10, video decoder 600 includes an entropy decoding unit 602, inverse quantization unit 604, inverse transform processing unit 606, intra prediction processing unit 608, inter prediction processing unit 610, summer 612, post filter unit 614, and reference buffer 616. Video decoder 600 may be configured to decode video data in a manner consistent with a video coding system. It should be noted that although example video decoder 600 is illustrated as having distinct functional blocks, such an illustration is for descriptive purposes and does not limit video decoder 600 and/or sub-components thereof to a particular hardware or software architecture. Functions of video decoder 600 may be realized using any combination of hardware, firmware, and/or software implementations.

As illustrated in FIG. 10, entropy decoding unit 602 receives an entropy encoded bitstream. Entropy decoding unit 602 may be configured to decode syntax elements and quantized coefficients from the bitstream according to a process reciprocal to an entropy encoding process. Entropy decoding unit 602 may be configured to perform entropy decoding according any of the entropy coding techniques described above. Entropy decoding unit 602 may determine values for syntax elements in an encoded bitstream in a manner consistent with a video coding standard. As illustrated in FIG. 10, entropy decoding unit 602 may determine a quantization parameter, quantized coefficient values, transform data, and prediction data from a bitstream. In the example, illustrated in FIG. 10, inverse quantization unit 604 and inverse transform processing unit 606 receive quantized coefficient values from entropy decoding unit 602 and output reconstructed residual data.

Referring again to FIG. 10, reconstructed residual data may be provided to summer 612. Summer 612 may add reconstructed residual data to a predictive video block and generate reconstructed video data. A predictive video block may be determined according to a predictive video technique (i.e., intra prediction and inter frame prediction). Intra prediction processing unit 608 may be configured to receive intra prediction syntax elements and retrieve a predictive video block from reference buffer 616. Reference buffer 616 may include a memory device configured to store one or more frames of video data. Intra prediction syntax elements may identify an intra prediction mode, such as the intra prediction modes described above. Inter prediction processing unit 610 may receive inter prediction syntax elements and generate motion vectors to identify a prediction block in one or more reference frames stored in reference buffer 616. Inter prediction processing unit 610 may produce motion compensated blocks, possibly performing interpolation based on interpolation filters. Identifiers for interpolation filters to be used for motion estimation with sub-pixel precision may be included in the syntax elements. Inter prediction processing unit 610 may use interpolation filters to calculate interpolated values for sub-integer pixels of a reference block. Post filter unit 614 may be configured to perform filtering on reconstructed video data. For example, post filter unit 614 may be configured to perform deblocking and/or Sample Adaptive Offset (SAO) filtering, e.g., based on parameters specified in a bitstream. Further, it should be noted that in some examples, post filter unit 614 may be configured to perform proprietary discretionary filtering (e.g., visual enhancements, such as, mosquito noise reduction). As illustrated in FIG. 10, a reconstructed video block may be output by video decoder 600. In this manner, video decoder 600 represents an example of a device configured to determine whether a subblock is predicted using uni-prediction or bi-prediction, select a first motion compensation interpolation filter based on the subblock being predicted using uni-prediction, and select a second motion compensation interpolation filter based on the subblock being predicted using bi-prediction and whether a condition based on a subblock width and a subblock height is satisfied, wherein the first and second motion compensation interpolation filters are defined according to cos-windowed sinc function and the first and second motion compensation interpolation filters have a distinct window and scale for the cos-windowed sinc function.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A method of video decoding, the method comprising:
receiving a current subblock width, sbWidth;
receiving a current subblock height, sbHeight;
determining whether a condition including sbWidth and sbHeight are both greater than 4 is satisfied;
determining whether a current subblock is predicted using bi-prediction; and
based on the condition being satisfied and the current subblock being predicted using bi-prediction, applying a motion compensation interpolation filter on the current subblock, wherein the motion compensation interpolation filter is defined according to following cos-windowed sinc function:

$$f(x) = \cos{^\wedge}a(Ax) * \text{sinc}(x/b)$$

wherein A is a scaling factor providing 12 taps,
a has a value between 0.90 and 0.98, and
b has a value between 0.96 and 0.99.

2. The method of claim 1, wherein a and b are selected such that motion compensation interpolation filter includes the following taps for a 6/16 phase: [−3, 8, −16, 28, −54, 204, 116, −39, 19, −10, 4, −1].

3. A device comprising one or more processors configured to:
receiving a current subblock width, sbWidth;
receiving a current subblock height, sbHeight;
determining whether a condition including sbWidth and sbHeight are both greater than 4 is satisfied;
determine whether a current subblock is predicted using bi-prediction; and
based on the condition being satisfied and the current subblock being predicted using bi-prediction, apply a motion compensation interpolation filter on the current subblock, wherein the motion compensation interpolation filter is defined according to following cos-windowed sinc function:

$$f(x) = \cos\hat{\,}a(Ax) * \mathrm{sinc}(x/b)$$

wherein A is a scaling factor providing 12 taps,
a has a value between 0.90 and 0.98, and
b has a value between 0.96 and 0.99.

4. The device of claim 3, wherein a and b are selected such that motion compensation interpolation filter includes the following taps for a 6/16 phase: [−3, 8, −16, 28, −54, 204, 116, −39, 19, −10, 4, −1].

5. The device of claim 3, wherein the device includes a video decoder.

6. The device of claim 3, wherein the device includes a video encoder.

* * * * *